US011847680B1

(12) United States Patent
Victor et al.

(10) Patent No.: US 11,847,680 B1
(45) Date of Patent: Dec. 19, 2023

(54) COMPUTER-IMPLEMENTED METHOD, A COMPUTING DEVICE, AND A NON-TRANSITORY COMPUTER READABLE STORAGE MEDIUM FOR PRESENTING ATTRIBUTE VARIATIONS

(71) Applicant: Amazon Technologies, Inc., Seattle, WA (US)

(72) Inventors: Maria Joseph Daniel Victor, Maple Valley, WA (US); Karthik Srinivasan, Bangalore (IN); Kousik Kumar Gopalan, Coimbatore (IN); Mayank Thakur, Lucknow (IN); Ryan LaBoube, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 45 days.

(21) Appl. No.: 17/360,114

(22) Filed: Jun. 28, 2021

(51) Int. Cl.
*G06Q 30/00* (2023.01)
*G06Q 30/0601* (2023.01)

(52) U.S. Cl.
CPC ..... *G06Q 30/0627* (2013.01); *G06Q 30/0603* (2013.01); *G06Q 30/0643* (2013.01)

(58) Field of Classification Search
CPC ........... G06Q 30/0627; G06Q 30/0603; G06Q 30/0643
USPC ...................................................... 705/26.63
See application file for complete search history.

(56) References Cited

U.S. PATENT DOCUMENTS 9,378,276 B1 * 6/2016 Mengle ................. G06F 16/951
9,594,540 B1 * 3/2017 Stasior ................. G06F 16/248
2013/0060801 A1 * 3/2013 Beaver, III ......... H04N 1/00161
707/758
2014/0280175 A1 * 9/2014 Gelfand ............... G06F 16/358
707/740
2014/0337052 A1 * 11/2014 Pellini .................... G16H 70/60
705/3

(Continued)

OTHER PUBLICATIONS

Ganchev, S. (2013). A study on academic search engines: Comparison between dynamic queries and regular faceted search (Order No. 1546377). Available from ProQuest Dissertations & Theses Global. (1453027329) Retrieved from https://www.proquest.com/dissertations-theses/study-on-academic-search-engines-comparison/docview/1453027329/se-2 (Year: 2013).*

*Primary Examiner* — Arielle E Weiner
(74) *Attorney, Agent, or Firm* — Kilpatrick Townsend & Stockton LLP

(57) ABSTRACT

Techniques are described herein for presenting attribute variations (differing attribute values) of an item at a network page. A request for the network page associated with an item of an electronic catalog can be received. In response to the request, the network page can be presented. The content and/or format of the network page can be predefined by an interface specification associated with the item and/or item category for the item. The network page may include a first area that includes an expanded view in which one or more variations of the first attribute are depicted and any suitable number of collapsed views in which one or more variations associated with a respective attribute are hidden from view. The areas of the network page may be dynamically expanded and collapsed to enable selection of various attribute values which may then be used to update the network page.

17 Claims, 20 Drawing Sheets

(56) References Cited

U.S. PATENT DOCUMENTS

| | | | |
|---|---|---|---|
| 2016/0085813 A1* | 3/2016 | Setty | G06F 16/24575 |
| | | | 707/734 |
| 2017/0357698 A1* | 12/2017 | Chang | G06F 16/954 |
| 2021/0048931 A1* | 2/2021 | Barzelay | G06Q 30/0601 |
| 2021/0357382 A1* | 11/2021 | Rishi | G06F 16/23 |

* cited by examiner

COMPUTER-IMPLEMENTED METHOD, A COMPUTING DEVICE, AND A NON-TRANSITORY COMPUTER READABLE STORAGE MEDIUM FOR PRESENTING ATTRIBUTE VARIATIONS

BACKGROUND

Users often browse electronic catalogs to view various items. When the items have a relatively large number of attribute variations (e.g., offered in various colors, sizes, materials, capacities, etc.), it can be cumbersome for the user to view these variations. Conventionally, the user would be navigated to a different network page where a given attributes variations can be viewed. This navigation is disruptive to the user and selection at this network page provides inadequate and ineffective visual feedback to the user as to how his selection affects the item. These deficiencies can lead to a frustrating and belabored user experience.

BRIEF DESCRIPTION OF THE DRAWINGS

Various embodiments in accordance with the present disclosure will be described with reference to the drawings, in which.

DETAILED DESCRIPTION

Figure 1:
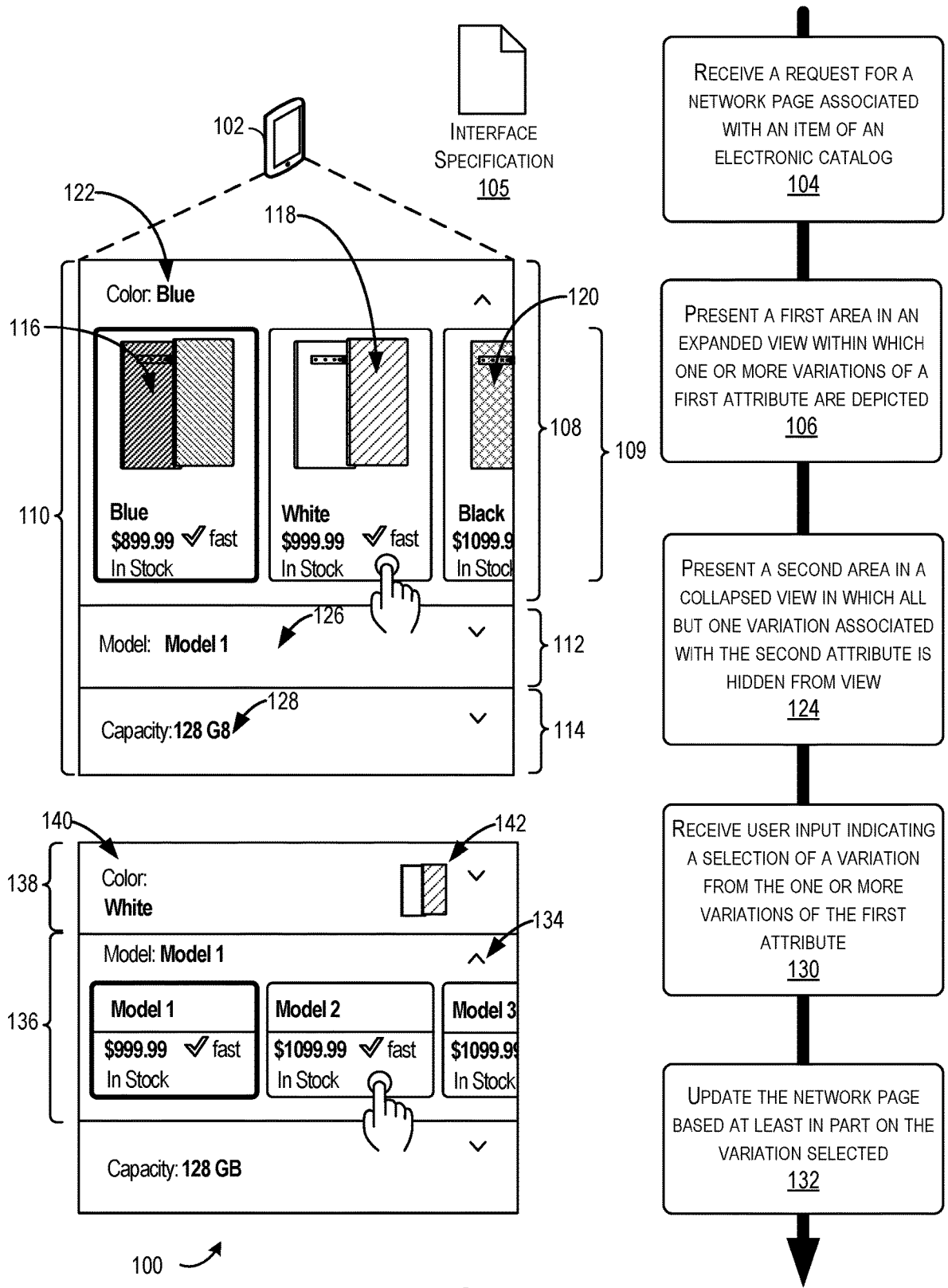
FIG. 1 is an example flow for presenting item attributes at a network page, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. As used herein, an "item" refers to any suitable object having any suitable combination of one or more physical attributes such as, but not limited to, size, color, capacity, material, fabric, version, pattern, model, and the like. An item may be associated with an item category of a number of item categories corresponding to various items provided within an electronic catalog. In some embodiments, an item may have one or more visual attributes and/or one or more non-visual attributes. An attribute can be said to be associated with a "visual dimension" when that attribute relates to a visual aspect (e.g., color, model, fabric, etc.) of the item and/or when selection of a variation (e.g., a particular value from the possible set of attribute values) of that attribute visually alters a depiction of the item. An attribute can be said to be associated with a "non-visual dimension" when that attribute relates to an aspect of the item (e.g., storage, capacity, processor speed, etc.) that has no visual component and/or when selection of a variation of that attribute does not visually alter a depiction of the item.

In some conventional systems, user's may view an item at a network page. Selection of an attribute (e.g., color) of that item would result in the user being navigated away from the original network page at which the item was presented in order to view a list of variations/values of that attribute. For example, upon selecting a "color" attribute, the user would be navigated to a different network page at which a set of colors associated with the item could be displayed. The user could select a particular variation, but other than the selection itself, had no visual feedback as to how the selection affected the visual representation of the item. In some cases, the user was required to exit out of the selection interface to return to the original network page in order to view an updated version of the item. These navigations away from and returning to the original network page create an inefficient and frustrating user experience in which the impact of the user's selection is cumbersome and delayed.

Techniques described herein are directed to presenting various user interface and/or interface elements to aid a user in viewing one or more attribute variations of an item (e.g., an item offered for procurement at an electronic catalog). These interfaces and/or interface elements may be specified via an interface specification and may enable a user to access information about a number of item attribute values without needlessly requiring the user to navigate to multiple network pages to make the selection and/or to view the visual ramifications of his selection. The user interfaces discussed herein may utilize various expanded and collapsed views which enable the user to easily identify and focus on a particular attribute of interest. Within an expanded view of an item attribute, the user may be provided horizontally scrollable selection areas from which any suitable number of attribute variations may be viewed all from the original network page at which the item is presented. As the user makes attribute variations selections corresponding to a visual dimension of the item, at least one visual depiction of the item may be updated to present a different visual representation of the item that corresponds with his selection. This techniques provide the user with the ability to provide more efficient user selections as well as notifying the user of the impact of his attribute selections as those selections are being made. This can reduce the overall time the user spends making such selections and decrease the likelihood of confusion and/or frustration.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates an example flow 100 for presenting (at user device 102) item attributes at a network page, in accordance with at least one embodiment. The user device 102 may be any suitable device capable of rendering content such as interfaces 300-1600 at one or more output devices (e.g., a display, a speaker, etc.).

The flow 100 may begin at 104, where a request for a network page associated with an item may be received. In some embodiments, content of the network page may be specified by an interface specification associated with the item of an electronic catalog (e.g., interface specification 105). In some embodiments, the interface specification may be obtained by a provider of the network page in response to receiving a request to display a network page associated with the item. In some embodiments, the network page 106 may be associated with the item and configured to display one or more attribute areas within which attributes of the item may be displayed. For example, FIG. 1 depicts three attribute areas (e.g., expanded area 108, collapsed area 112, and collapsed area 114). Additional information associated with the item may also be displayed at the network page although this information may not be depicted in FIG. 1. Any aspect and/or data provided via the network page 106 and/or via any interface and/or graphical interface elements of the interfaces of FIGS. 1 and 3-16 may be provided in accordance with the interface specification.

At 106, a first area (e.g., an attribute area such as expanded area 108) may be presented in an expanded view within which one or more variations of a first attribute are depicted. As used herein, the term "variations" may be used to refer to differing attribute values of a given attribute. In some embodiments, the expanded area 108 may be initially presented in an expanded view. In an expanded view, one or more values of an attribute may be represented by one or more graphical interface elements. These graphical interface elements may correspond to options to select one of the attribute value. As depicted in FIG. 1, three variations may be presented within expanded area 108, although any suitable number may be utilized. In some embodiments, a subset of the total number of graphical interface elements may be viewable initially. Expanded area 108 may be presented within a larger attribute area (e.g., an item attribute area 110) adjacent and/or proximal to collapsed areas 112 and 114. Collapsed areas 112 and 114 may correspond to a respective attribute for which a default value alone is presented.

As depicted in FIG. 1, the first area (e.g., expanded area 108) includes three variations of the item attribute, although any suitable number of variations may be similarly employed. By way of example, a smartphone may be offered in any suitable number (e.g., 3) of colors. As depicted, the smartphone is offered in blue, white, and black. The expanded area 108 further includes a carousel (e.g., carousel 109) of one or more graphical interface elements (e.g., graphical interface elements 116-120) that each correspond to a unique attribute variation. By way of example, graphical interface element 116 may be presented to represent the smartphone as offered in blue, graphical interface element 118 may be presented to represent the smartphone as offered in white, and graphical interface element 120 may be presented to represent the smartphone as offered in black.

In some embodiments, at least some portion of one or more graphical interface elements corresponding to one or more item attribute variations may be initially hidden and/or only partially viewable within the expanded area 108. For example, graphical interface element 120 corresponding to the smartphone as offered in black may initially be only partially viewable within the expanded area 108. For example, a carousel 109 may be included within the expanded area 108 to enable the user to view all of the attribute variations. Carousel 109 can be horizontally scrollable such that the user may use an input device (e.g., a mouse, a finger, a stylus, etc.) to scroll to the right and/or left. In some embodiments, such as when the user is using a touch input device, the user may swipe to the left or right in order to scroll to the right or left within the carousel 109 to present various combinations of the variations (e.g., blue, white, black) available for that attribute (e.g., color).

In some embodiments, an expanded view of an item attribute (e.g., expanded area 108) includes an indication of a default value for the item attribute and at least one graphical interface element corresponding to an attribute variation. In some embodiments, each graphical interface element may present metadata (e.g., price, shipping speed, availability, shipping time, and/or the like) associated with the item. The particular metadata that is presented within each graphical interface element may be configurable (e.g., as specified in interface specification 105). In some embodiments, this metadata may include at least one visual representation (e.g., an image of the item representing a corresponding attribute variation such as the smartphone as depicted in blue). By way of example, a default value for the color attribute may be presented at 122 and an image of the item (e.g., the smartphone as offered in the color corresponding to the graphical interface element 116) may be provided within the graphical interface element 116. In some embodiments, each of the graphical interface elements 116-118 may include an image of the item that is unique to the attribute value (e.g., blue, white, black) and which differs from the other images presented in the other graphical interface element.

An order in which the graphical interface elements 116-118 are presented within expanded area 108 may be configurable (e.g., as specified in interface specification 105). In some embodiments, the graphical interface element 116, corresponding to the default value for the attribute may be visually distinct (e.g., presented with a bolder edge, presented with a different color text and/or background, etc.) from the other graphical interface elements of expanded area 108. In some embodiments, the graphical interface elements 118-120 may be positioned and/or sorted such that the graphical interface elements corresponding to the default value (and/or the currently selected variation) is presented in a first position (e.g., in this case, a left-most position within the). In some embodiments, the carousel 109 may be configured to be circular such that scrolling further past the last graphical interface element (e.g., in the same direction as the end of the list of attribute variations) causes the carousel 109 to display the first graphical interface element to the right of the last graphical interface element in the carousel and continuing with the other graphical interface elements in the list in the order provided in interface specification 105. Similarly, scrolling past the first graphical interface element (e.g., in the same direction as the beginning of the list of attribute variations) may cause the carousel 109 to display the last graphical interface element in the list (e.g., graphical interface element 120) to the left of the graphical interface element 116 corresponding to the first attribute variation in the list and continuing with the other graphical interface elements in the list in the reverse order provided in interface specification 105.

At 124, a second area (or more than one second area) may be presented in a collapsed view in which all but one variation associated with a second attribute is hidden from view (or at least one variation is hidden from view). In some embodiments, only a single attribute variation is displayed within a collapsed view regardless of whether other variations of that attribute are hidden and/or exist. For example, item attribute area 110 may include one or more attribute areas (e.g., collapsed area 112 and collapsed area 114) that are depicted in a collapsed view. A default value or last selected value for the attribute may be presented within collapsed area 112 and collapsed area 114 as depicted at 126 and 128, respectively.

In some embodiments, an interface specification may be obtained for a network page associated with the item which specifies any suitable aspect of the presentation of the item attribute variations. The interface specification may be in any suitable form (e.g., JSON format, XML, etc.) and may specify the attributes and corresponding attribute variations to be presented (e.g., the attributes/variations in which the item is offered), the order in which said attributes and corresponding attribute variations are presented, the metadata presented within each graphical interface element, the format/order/arrangement of attribute areas within the network page, or any suitable aspect of presenting item attribute variations within the graphical interfaces discussed herein.

At 130, user input may be received indicating a selection of a variation from the one or more variations of the first attribute (e.g., color). By way of example, the user input may indicate a selection of the graphical interface element 118.

At 132, the network page may be updated based at least in part on the variation selected. For example, in response to the selection at 130, the graphical interface element 118 may be altered to indicate that the attribute corresponding to the graphical interface element 118 is currently selected. In some embodiments, the user may navigate to another attribute area. For example, the user may select any suitable location (e.g., interface element 134) within the collapsed area 112 to expand the area to present expanded area 136. Expanded area 136 may present a default value for the attribute and one or more graphical interface elements which individually may represent a different attribute variation (in this example, different models). Each graphical interface element within expanded area 136 may present any suitable metadata (e.g., the same or different metadata as depicted in graphical interface elements 116-120). In some embodiments, as described above, the metadata displayed with the graphical interface elements depicted within expanded area 136 may be specified within the interface specification 105.

In some embodiments, selection of the collapsed area 112 (e.g., selection of the interface element 134 or any suitable location within the collapsed area 112) may cause the collapsed area 112 to expand to expanded area 136 and expanded area 108 to collapse to collapsed area 138. In some embodiments, the collapsed area 138 may include any suitable data corresponding to the user's previous selection within expanded area 108. By way of example, subsequent to receiving user input indicating the selection of graphical interface element 118 and a selection to expand collapsed area 112 to expanded area 136, the expanded area 108 may be collapsed to collapsed area 138 where a textual element 140 (e.g., "white") and a graphical element 142 (e.g., an image of the item in white) that corresponds with the currently value for that attribute may be displayed, while all other variations and/or metadata corresponding to other variations are hidden.

By utilizing the techniques discussed herein, the user may be enabled to focus on a particular attribute at a time. Through the use of expanded areas described herein, the user can scroll through various item attribute variations to make selections that can update metadata and/or a visual representation of an item such that the user is immediately informed of the consequences of his selection. The expanded areas and collapsed areas of the user interfaces presented herein are dynamically provided at the same network page associated with the item in response to user input to avoid the disjointed and disruptive techniques associated with conventional user interfaces.

Figure 2:
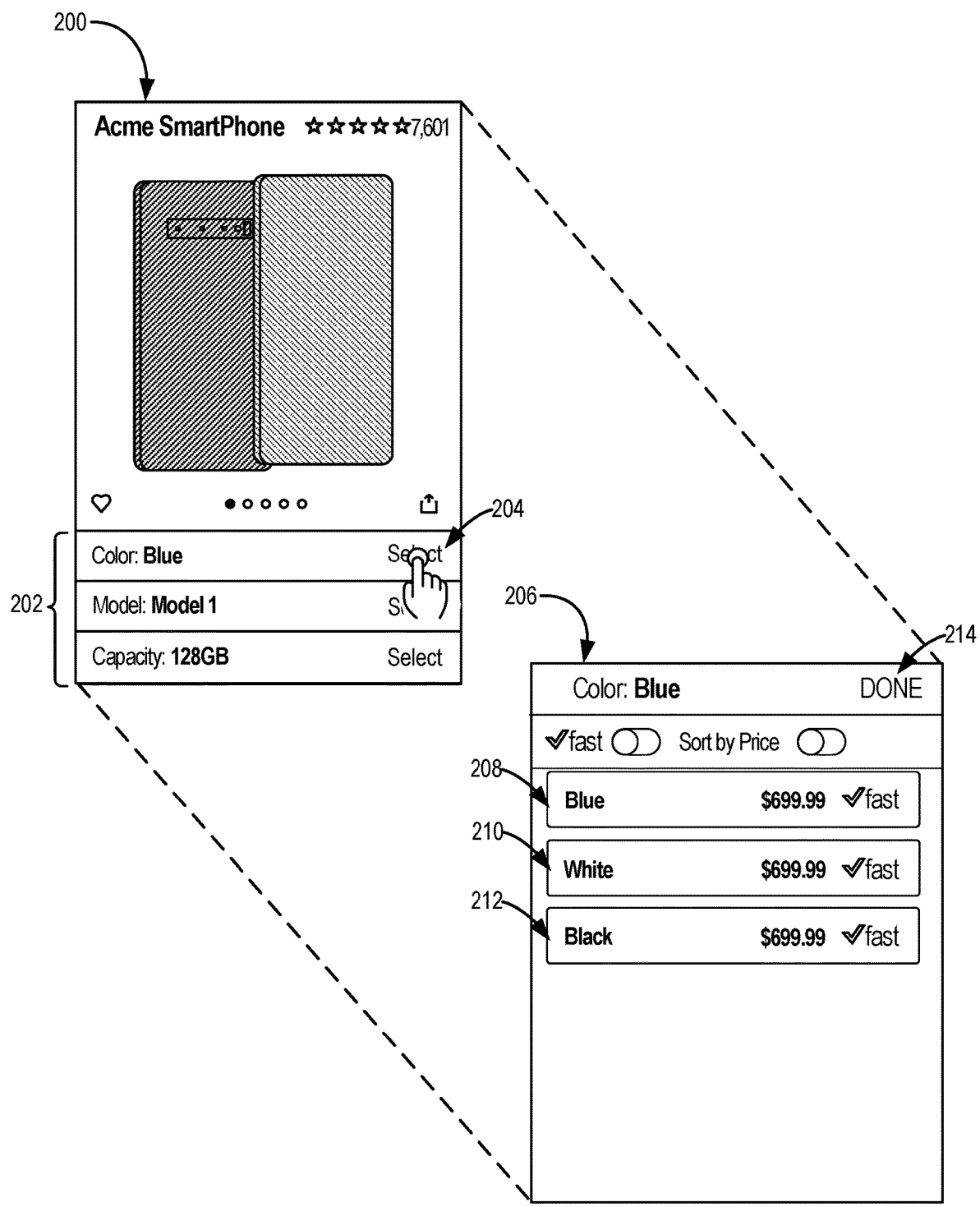
FIG. 2 is an example of conventional user interfaces presenting item attributes.

FIG. 2 is an example of conventional user interfaces presenting item attributes. User interface 200 is intended to depict an initial network page associated with an item. In previous systems, the user interface 200 may present a list of default values corresponding to any suitable number of item attributes. As depicted in FIG. 2, the user interface 200 includes default values 202 corresponding to color, model, and capacity. When an area or link corresponding to the attribute (e.g., link 204) is selected, the user is navigated to a separate network page (e.g., user interface 206 corresponding to the attribute "color") where a list of options (e.g., options 208-212, for example) are displayed. In some embodiments, the user may select an option from the list (e.g., option 208) and then select another link (e.g., link 214) to return to the user interface 200 of the original network page. When the user makes a selection within the list, no other feedback is provided other than an indication the option was selected. The user is not afforded any updated visual representation of the item in accordance with his selection.

Figure 3:
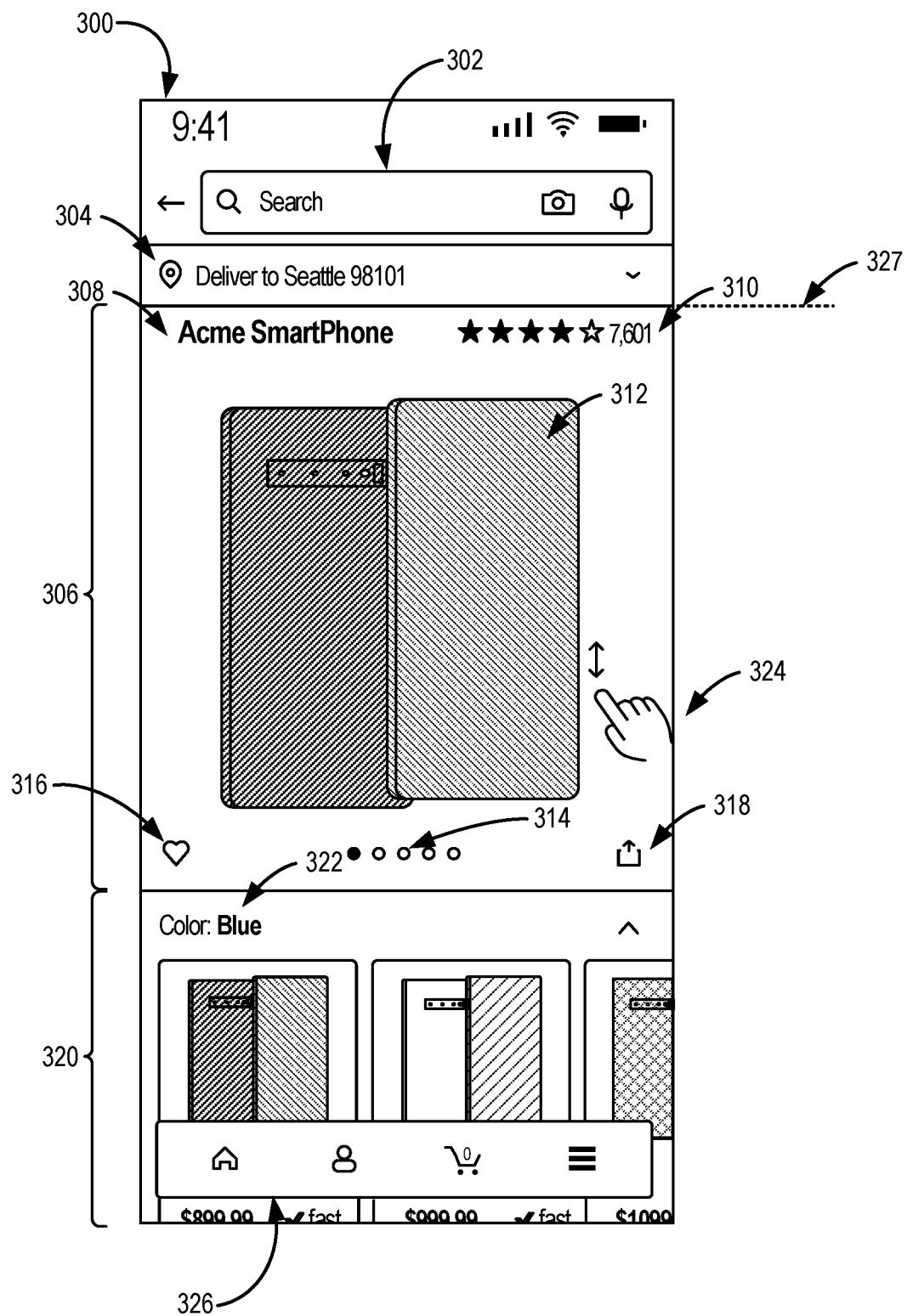
FIG. 3 is an example user interface for presenting item attributes, in accordance with at least one embodiment.

FIG. 3 is an example user interface 300 for presenting item attributes, in accordance with at least one embodiment. FIG. 3 is intended to depict an initial view of the user interface 300. User interface 300 may include search bar 302. In some embodiments, delivery information 304 may be displayed within the user interface 300 at any suitable position (e.g., below the search bar 302). The user interface 300 may further include heading information 306 (e.g., title 308, review information 310 (e.g., indicating a rating and/or number of reviews), one or more images including image 312 and corresponding navigational options 314 for navigating between the images, a favorite option 316, a sharing option 318, and the like. The placement of heading information 306 may be specified within an interface specification (e.g., the interface specification 105 of FIG. 1) or the placement and content of heading information 306 may be otherwise predefined.

In some embodiments, an item attribute area 320 (e.g., an example of the item attribute area 110 of FIG. 1) may be positioned adjacent to and directly below the heading information 306. In some embodiments, the item attribute area 320 may include any suitable number of attribute areas (e.g., subareas of the item attribute area 320 that individually correspond to a single item attribute such as color, model, capacity, fabric, texture, flavor, scent, and the like. In some embodiments, the order of these attribute areas may be specified in the interface specification corresponding to the item. In other examples, the interface specification can specify a type associated with the attribute that identifies the attribute as having or being associated with a visual component/dimension or as not having/being associated with a visual component/dimension. By way of example, the attribute "color" may be specified as being an attribute that is associated with a visual component as there is an image identified as corresponding to each color attribute value (e.g., blue, white, black, etc.) that depicts the item in the corresponding color. The interface specification can store a mapping of the attribute value to a corresponding identifier associated with an image or other visual component. In some embodiments, any attribute area (e.g., color) may display a default value and/or a last selected value. By way of example, an attribute area corresponding to a color attribute of the item may display "blue" as the default value as depicted at 322. In some embodiments, should the user make a selection that changes the attribute value (e.g., by selecting an option corresponding to a white item), the value displayed at 322 may be updated to represent the last selected attribute value.

The user interface 300 may be scrollable. In some embodiments, the user interface 300 may be initially displayed as aligned with the top boundary 327 of the network page. In this position, at least a portion of the heading information 306 may be displayed. In some embodiments, at least a portion of an attribute area (e.g., item attribute area 320) may be presented below the heading information 306 within user interface 300. The user may provide user input at the user device (e.g., the user device 102 of FIG. 1) to scroll downward within the network page as depicted at 324.

The user interface 300 may include navigation bar 326 which may include any suitable number and/or arrangement of navigational options and/or menu options. In some embodiments, one or more icons corresponding to an option may be presented within navigation bar 326. Selection of an option may cause a predefined action to be executed (e.g., selection of an icon associated with a shopping cart causes the user to be navigated to a network page associated with his shopping cart). In some embodiments, the navigation bar 326 may remain in a fixed position while the network page is displayed regardless of user input indicating navigation and/or selection.

Figure 4:
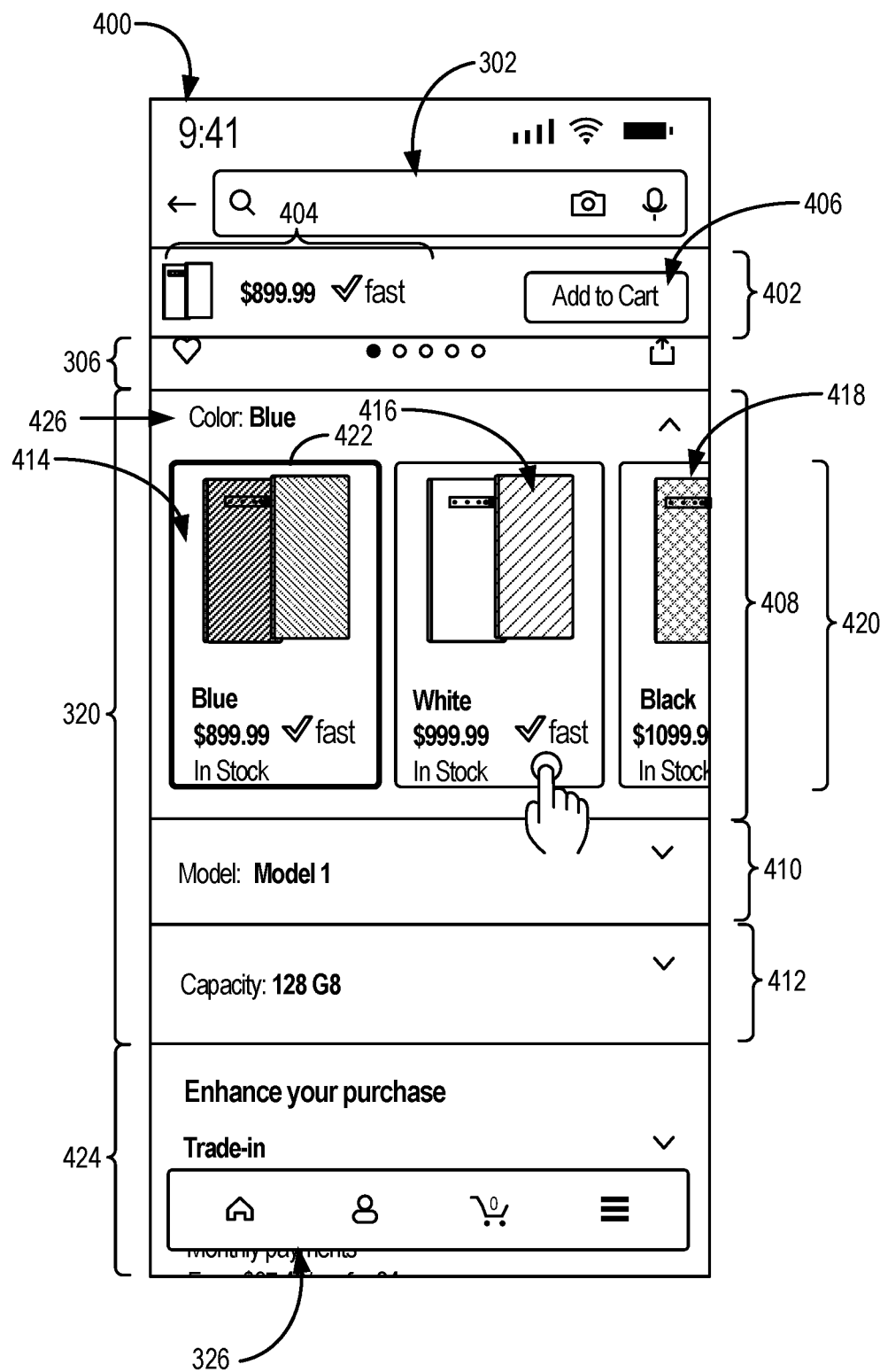
FIG. 4 is an example user interface for presenting an area that includes an expanded view of one or more variations of an item attribute, in accordance with at least one embodiment.

FIG. 4 is an example user interface 400 for presenting an attribute area (e.g., item attribute area 320 of FIG. 3) that includes an expanded view 402 (e.g., an example of the expanded area 108 of FIG. 1) of one or more variations of an item attribute, in accordance with at least one embodiment. User interface 400 may be presented subsequent to receiving user input within user interface 300 of FIG. 3 that indicates the user has scrolled downward within the network page.

Search bar 302 may be configured to be positioned at the top of user interfaces 300, 400, and 700-1300, irrespective of any scrolling action provided via user input and will not be mentioned again for brevity. In response to receiving a scrolling input indicating the user has navigated to a position within the network page that is no longer aligning with a top boundary of the network page (e.g., top boundary 327 of FIG. 3), the heading information 306 and item attribute area 320 may be scrolled upward within the user interface 400.

In some embodiments, upon determining that the user has navigated to a position within the network page that is no longer aligning with the top boundary of the network page, current selection data 402 may be positioned/docked at the top boundary of the network page. Current selection data area 402 may initially display information for an item that has attributes corresponding to a default attribute set as defined in an interface specification associated with the item and/or item category of the item (e.g., the interface specification 105 of FIG. 1). In some embodiments, the interface specification may specify a default value for any suitable number of attributes in any suitable manner. By way of example, the default value may be explicitly defined in the interface specification or inferred based on an order of attribute values associated with the item (with the default value being the first, for example, in the list of possible attribute values). If user input is received selecting one or more graphical interface elements corresponding to different attribute values, the current selection data area 402 may be updated to present any suitable information associated with an item having the attribute values selected. In some embodiments, metadata 404 (which may be predefined and/or defined within the interface specification) may include any suitable combination of item attributes including, but not limited to, price, shipping speed, an image of the item having the default or selected attributes, an availability, a rating, a number of reviews, or any suitable data associated with an item from the electronic catalog. In some embodiments, the current selection data area 402 may include an option 406 for adding an item corresponding to the currently selected (and/or default) item attributes to a digital cart (e.g., a digital shopping cart, a digital wish list, etc.). In some embodiments, the digital cart may be associated with a profile and/or account of the user such that the items contained in the cart may persist until one of a particular set of actions has occurred (e.g., the user completes an order for the item, the user deletes the item from the digital cart, etc.).

Item attribute area 320 may include one expanded area (e.g., an attribute area such as expanded area 408) within which one or more variations of an attribute (here, color) are depicted. In some embodiments, only one expanded area may be displayed at a time. For example, expanded area 408 may be initially presented on an interface specification associated with the network page and/or item while collapsed areas 410 and 412 (corresponding to attributes model and capacity, respectively) are presented in a collapsed view. In some embodiments, the interface specification may specify an order by which multiple attribute areas are presented. As a non-limiting example, the interface specification associated with the network page depicted in FIG. 4 may specify that attribute areas corresponding to color, model, and capacity are to be presented in that order. In some embodiments, various attributes associated with the item may be specified within the interface specification as being associated with a visual dimension and/or component or not being associated with a visual dimension and/or component. In some embodiments, attribute areas corresponding to attributes which are specified as being associated with a visual dimension and/or component may be prioritized and positioned within the network page above attribute areas corresponding to attributes which are not associated with a visual dimension and/or component. In some embodiments, the interface specification for a given network page may be associated with an item identifier and/or an item category. By way of example, items corresponding to a common item category (e.g., electronics, clothing, perishables, televisions, and the like) may share a common interface specification. This may enable a unified presentation of the various network pages corresponding to items which share a category.

As similarly described in connection with the expanded area 108 of FIG. 1, the expanded area 408 may include one or more graphical interface elements. These graphical interface elements may correspond to options to select one of the attribute variations (e.g., different values of the given attribute such as the attribute values "blue," "white," or "black" for the attribute "color"). In some embodiments, a subset or all of the total number of graphical interface elements may be viewable initially. By way of example, graphical interface elements 414-418 (or any suitable number of graphical interface elements) may be presented within expanded area 408. Collapsed areas 410 and 412 may correspond to a respective attribute for which a default value alone is presented.

As similarly described in FIG. 1, the expanded area 408 (e.g., corresponding to the expanded area 108) includes three variations of the item attribute, although any suitable number of variations may be similarly employed. By way of example, a smartphone may be offered in any suitable number (e.g., 3) of colors. As depicted, the smartphone is offered in blue, white, and black. The expanded area 408 further includes a carousel 420 (e.g., an example of carousel 109) within which one or more graphical interface elements (e.g., graphical interface elements 414-418) is displayed, each corresponding to a unique attribute variation/value. By way of example, graphical interface element 414 may be presented to represent the smartphone as offered in blue, graphical interface element 416 may be presented to represent the smartphone as offered in white, and graphical interface element 418 may be presented to represent the smartphone as offered in black.

In some embodiments, at least some portion of one or more graphical interface elements corresponding to one or more item attribute variations may be initially hidden and/or only partially viewable within the expanded area 408. For example, graphical interface element 418 corresponding to the smartphone as offered in black may initially be only partially viewable within the expanded area 408. For example, a carousel 420 may be included within the expanded area 408 to enable the user to view all of the attribute variations. Carousel 420 can be horizontally scrollable such that the user may use an input device (e.g., a mouse, a finger, a stylus, etc.) to scroll to the right and/or left. In some embodiments, such as when the user is using a touch input device, the user may swipe to the left or right in order to scroll to the right or left within the carousel 420 to present various combinations of the variations (e.g., blue, white, black) available for that attribute (e.g., color).

In some embodiments, an expanded view of an item attribute (e.g., expanded view 408) includes an indication of a default value for the item attribute and at least one graphical interface element corresponding to an attribute variation. In some embodiments, each graphical interface element may present metadata (e.g., any suitable combination of price, shipping speed, availability, rating, number of reviews, discount, shipping time, and/or the like) associated with the item. The particular metadata that is presented within each graphical interface element may be configurable (e.g., as specified in interface specification 105). In some embodiments, this metadata may include at least one visual representation. By way of example, graphical interface element 414 may include an image of the item representing a corresponding attribute variation such as the smartphone as depicted in blue.

In some embodiments, a default value for the color attribute may be presented within the expanded area 408 and a graphical interface element (e.g., graphical interface element 414) corresponding to the default value for the color attribute may be initially selected. As described herein, the particular order and/or the default value for the various attribute values may be specified in the interface specification associated with the item and/or item category. In some embodiments, the order of the attribute values may be determined by an order associated with attribute values as identified within an object that serves as a storage container for the attributes of the item. In some embodiments, the object may be obtainable based at least in part on retrieving an item corresponding to an item identifier associated with the network page. In some embodiments, any suitable number of the graphical interface elements 414-418 may include an image of the item that is unique to the attribute value (e.g., blue, white, black) and which differs from the other images presented in the other graphical interface element.

In some embodiments, the graphical interface element 414, corresponding to the default value for the color attribute may be visually distinct (e.g., presented with a bolder edge, presented with a different color text and/or background, etc.) from the other graphical interface elements of expanded area 408. In some embodiments, the graphical interface elements 414-418 may be positioned and/or sorted such that the graphical interface elements corresponding to the default value (and/or the currently selected variation) is presented in a first position (e.g., in this case, a left-most position within the expanded area 408). In some embodiments, the carousel 420 may be configured to be circular as similarly described above in connection with FIG. 1.

Although only one attribute area is depicted as being expanded at any given time, in some embodiments, multiple attribute areas may be provided in expanded view. By way of example, the expanded area 408 may be presented at a same time as the expanded area 710 of FIG. 7. The specific number of expanded areas and the arrangement of said expanded areas (and/or the arrangement of any suitable number of collapsed areas) may be specified in the interface specification associated with the item and/or item category. As a non-limiting example, a user interface for an item having one item attribute (or two item attributes) may present the item attribute in an expanded area, in accordance with the interface specification. As another example, a user interface for an item having three or more attributes may present only one attribute in an expanded area while the remaining attributes are presented in corresponding collapsed areas.

Figure 5:
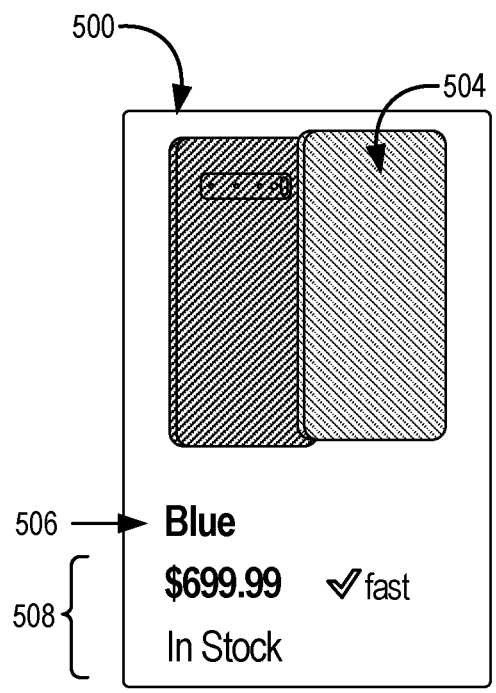
FIG. 5 depicts example graphical interface elements for presenting a particular set of metadata associated with an item attribute variation, in accordance with at least one embodiment.
Figure 5:
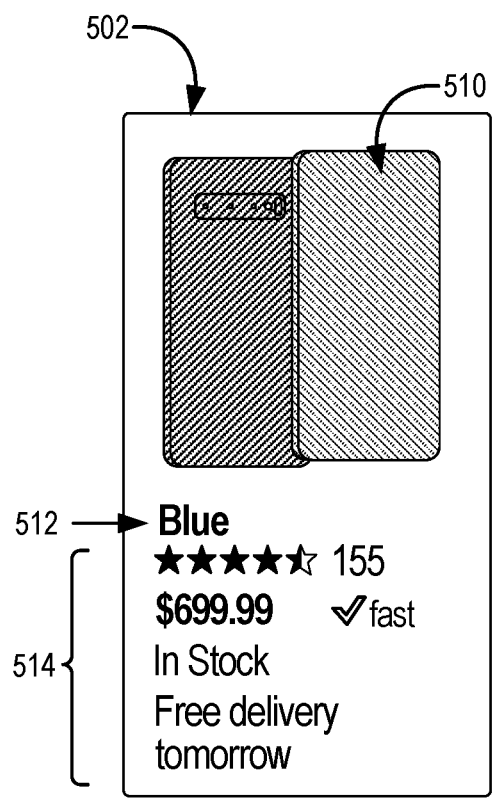

FIG. 5 depicts example graphical interface elements 500 and 502 for presenting a particular set of metadata associated with an item attribute variation, in accordance with at least one embodiment. Graphical interface elements 500 and 502 may individually represent an example of any of the graphical interface elements discussed herein.

In some examples, user interface element 500 may optionally depict an image of an item (e.g., image 504) corresponding to item attribute value 506 (e.g., the color "blue"). In some embodiments, metadata 508 may be presented within the user interface element 500. The metadata 508 may include any suitable combination of one or more data elements associated with the item such as, but not limited to a price, an availability indicator, a shipping speed, an estimated delivery date, an item rating, a number of reviews, a link to a review page associated with the item at which reviews of the item may be viewed, or the like. As depicted in FIG. 5, metadata 508 includes a price ($699.99), an availability indicator ("In Stock"), and a shipping speed (an icon associated with fast delivery such as one-day delivery). The particular data elements presented within graphical interface element 500 may be specified within an interface specification (e.g., the interface specification 105 of FIG. 1) associated with a particular item (e.g., the item associated with the network page on which the graphical interface element 500 is displayed) and/or item category.

Similarly, user interface element 502 may optionally depict an image of an item (e.g., image 510) corresponding to item attribute value 506 (e.g., the color "blue"). In some embodiments, metadata 514 may be presented within the user interface element 502. The metadata 514 may include any suitable combination of one or more data elements associated with the item such as, but not limited to a price, an availability indicator, a shipping speed, an estimated delivery date, an item rating, a number of reviews, a link to a review page associated with the item at which reviews of the item may be viewed, or the like. As depicted in FIG. 5, metadata 514 includes a price ($699.99), an availability indicator ("In Stock"), a shipping speed (an icon associated with fast delivery such as one-day delivery), an estimated delivery date and/or shipping price ("free delivery tomorrow"), an item rating (4 out of 5 stars), and a number of reviews (155). The particular data elements presented within graphical interface element 502 may be specified within an interface specification (e.g., the interface specification 105 of FIG. 1) associated with a particular item (e.g., the item associated with the network page on which the graphical interface element 502 is displayed) and/or item category.

In some embodiments, the particular data elements of metadata presented within a graphical interface element may differ depending on the attribute for which the graphical interface element is displayed. By way of example, the particular data elements presented as metadata within a graphical interface element associated with a color attribute may differ from the metadata presented within a graphical interface element corresponding to a capacity attribute, which in turn may be the same or differ from metadata presented within a graphical interface element corresponding to a model attribute. The interface specification corresponding to the network page on which such graphical interface elements are presented may include multiple sub-portions corresponding to formats and content to be provided within a graphical interface element depending on the attribute for which the graphical interface element is presented.

Figure 6:
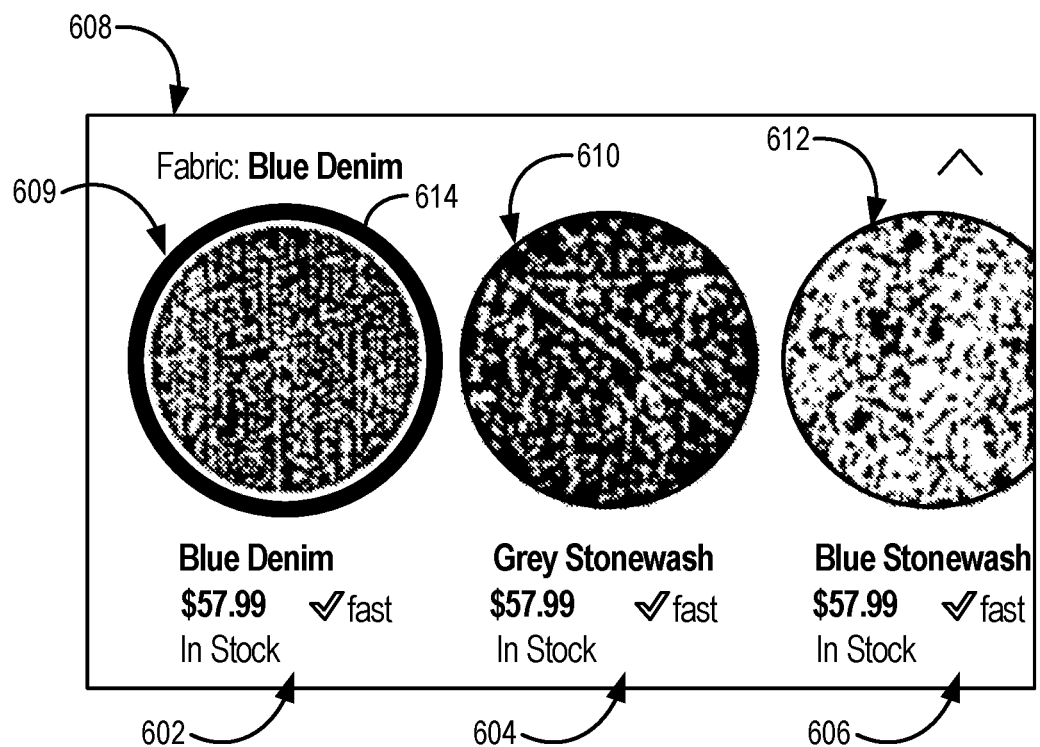
FIG. 6 depicts example graphical interface elements for visually depicting item attribute variations, in accordance with at least one embodiment.

As another example, FIG. 6 depicts example graphical interface elements 602-606 for visually depicting item attribute variations, in accordance with at least one embodiment. In some embodiments, an image corresponding to each item attribute value (e.g., blue denim, grey stonewash, blue stonewash, etc.) may be presented (e.g., within expanded area 602, an example of the expanded area 408 of FIG. 4 but corresponding to an item having an attribute "fabric").

As a non-limiting example, the expanded area 608 may be presented at a network page associated with an article of clothing (e.g., a pair of jeans, a shirt, etc.) that is associated with a fabric attribute. In some embodiments, user interface elements 602-606 may be borderless, as depicted in FIG. 6, or may be bordered as similarly depicted by the graphical interface elements of FIGS. 4 and 5. Although examples above may provide an image of the item within a graphical interface element (e.g., a picture of a blue smartphone within a graphical interface element associated with a color attribute and color value of blue), an image of any suitable aspect of the item or representation of such aspect may be additionally or alternatively presented within a graphical interface element. By way of example, a visual representation of the fabric variations of an item may be provided with images 609, 610, and 612 (and/or with any suitable number of currently hidden images corresponding to currently hidden graphical interface elements). A selected and/or defaulted value (thus serving as a currently selected) may be indicated based at least in part on presenting a corresponding graphical interface element as being distinct from the other graphical interface elements. For example, the currently selected/default attribute value can be indicated based at least in part on position (e.g., a left-most graphical interface element within a carousel), by color, by background, by border, or the like. As depicted in FIG. 6, "blue denim" may be the currently selected (by virtue of being assigned as a default value for the fabric attribute within an interface specification that defines the expanded area 608) and such selection may be visually depicted using border 614.

Returning to FIG. 4, a currently selected value (by virtue of user selection or from being assigned as a default value for the color attribute within an interface specification that defines expanded area 408) may be depicted using border 422 within carousel 420 (e.g., an example of the carousel 109 of FIG. 1).

Collapsed areas 410 and 412 may be presented in a collapsed view in which all but one variation (e.g., initially the default value) associated with a respective item attribute is hidden from view. In some embodiments, only a single attribute variation (e.g., "Acme Model 1" and "128 GB," respectively) is displayed within a collapsed view regardless of whether other variations of that attribute are hidden and/or exist.

In some embodiments, additional data (e.g., purchase options 424) may be presented via the network page. The additional data may be presented at a position below the item attribute area 320.

Figure 7:
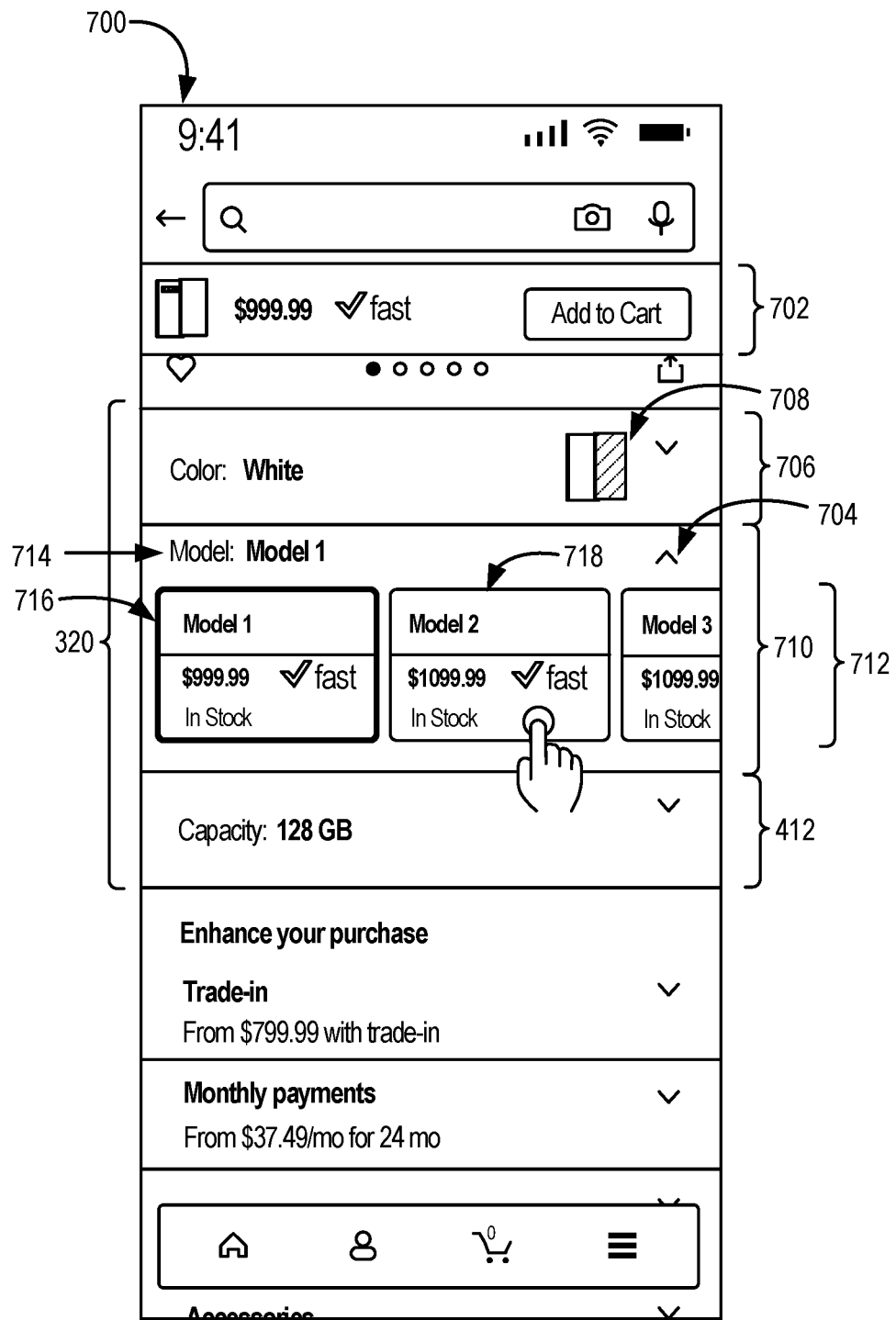
FIG. 7 is another example user interface for presenting another area that includes an expanded view of one or more variations of another item attribute, in accordance with at least one embodiment.

In some embodiments, user input may be received at graphical interface element 416 indicating a user selection of a particular attribute value (e.g., a color "white"). Upon selecting graphical interface element 416 a border similar to border 422 may be placed around graphical interface element 416. Upon selecting the graphical interface element 416, the currently selected attribute value presented at 426 may be updated (e.g., to display "white") in accordance with the user input. Likewise, any suitable portion of the currently selected data may be updated (as depicted in FIG. 7) to reflect any suitable metadata and/or aspects of the item having the attributes of the currently selected attribute values for the collective set of attributes presented within item attribute area 320 (e.g., color: white, model: Acme Model 1, capacity: 128 GB).

FIG. 7 is another example user interface 700 for presenting another area that includes an expanded view of one or more variations of another item attribute, in accordance with at least one embodiment. As discussed above in connection with FIG. 4, upon selecting graphical interface element 416 of FIG. 4, currently selected data 702 may be presented as an updated version of the attribute values and/or the metadata corresponding to an item having the attribute values of the collective set of currently selected attribute values depicted within item attribute area 320.

At any suitable time, user input may be received within any suitable location of collapsed area 410 of FIG. 4 (e.g., at user interface element 704). Upon receiving such input, the user interface 700 may transition from displaying the expanded areas 408 of FIG. 4, to presenting collapsed areas 706 and 412. The collapsed area 706 may represent a collapsed view associated with the same attribute corresponding to the expanded area 408. In some embodiments, the collapsed area 706, and/or any suitable collapsed area corresponding to an attribute which is associated with a visual component, may be updated to present image 708 of the item (or of a representation of an attribute of the item such as a fabric attribute for a clothing item) may be depicted within collapsed area 706.

Also in response to receiving the user input, the user interface 700 may be used to transition from displaying the collapsed area 410 to presenting expanded area 710 which may correspond to the same attribute as the collapsed area 410. Said another way, when a user selects the model attribute area, the previously collapsed view of the model attribute may be expanded and the previously expanded view of the color attribute may be collapsed as depicted in FIG. 7.

The expanded area 710 may also include a carousel 712 and any suitable number of graphical interface elements corresponding to any suitable number of attribute values for the corresponding attribute (e.g., model). A currently selected value may be displayed at 714. Initially, the currently selected value may display a default value (e.g., "Acme Model 1") as defined by the interface specification (e.g., the interface specification 105 of FIG. 1) and/or by position of a set of attribute values within an object associated with an item identifier associated with the network page. Graphical interface element 716 may initially be selected (as indicated by a border, text color, background color, or the like) as corresponding to the currently selected attribute value. As described in the figures above, the user may scroll left or right within the carousel 712 to view the various attribute values available for the item.

In some embodiments, user input may be received that indicates a selection of the graphical interface element 718 corresponding to a model attribute value of "model 2." In response to this user input, the currently selected value presented at 714 may be updated to present "model 2" as the currently selected value. Likewise, the currently selected data 702 may be updated to present attribute values and/or metadata corresponding to the currently selected values of the combined set of attributes (e.g., color, model, and capacity, in this example). The updated currently selected values are depicted at 802 of FIG. 8.

Figure 8:
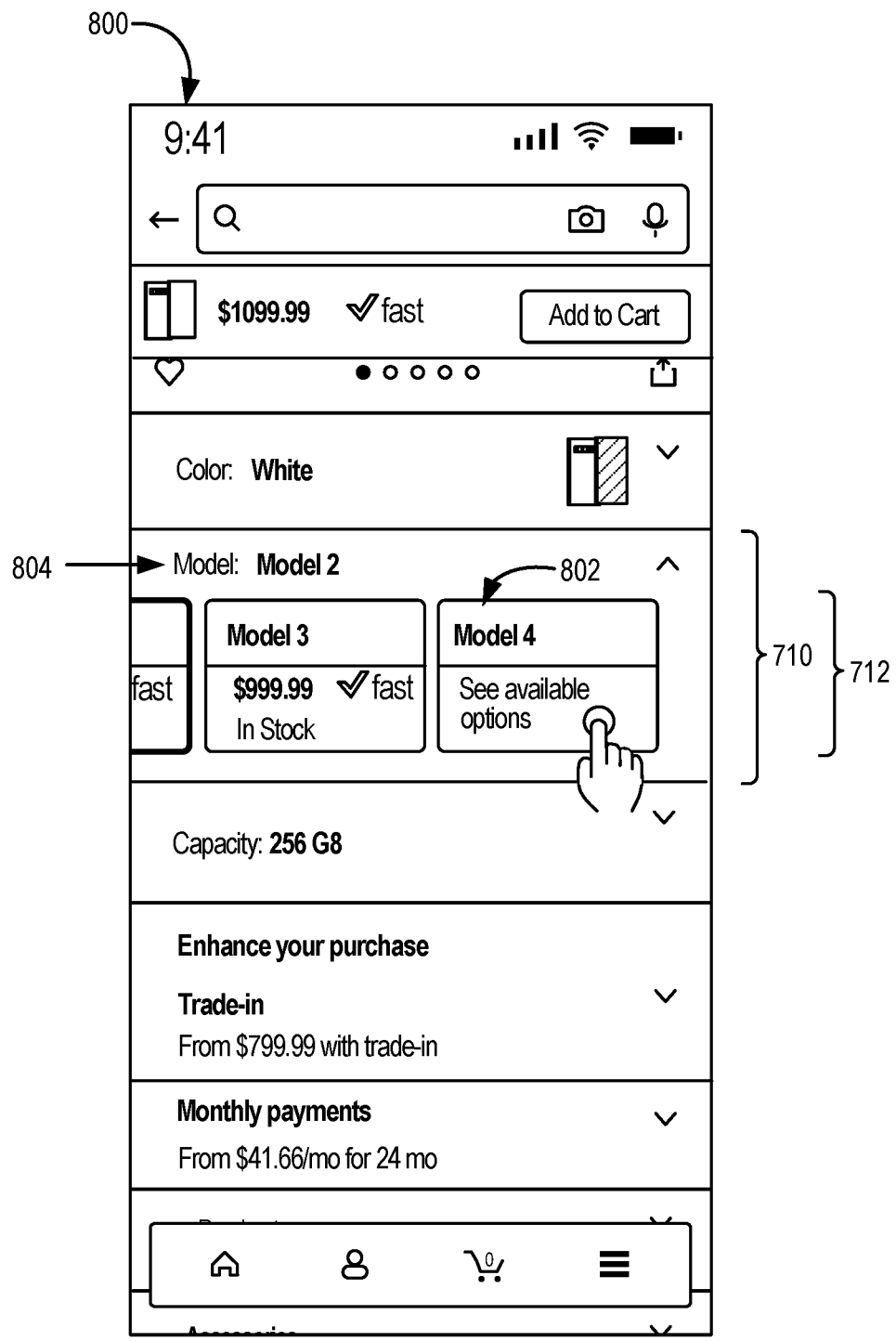
FIG. 8 depicts an example user interface in which selection of an attribute value corresponding to one item attribute modifies one or more previously selected item attribute values, in accordance with at least one embodiment.

FIG. 8 depicts an example user interface 800 in which selection of an attribute value corresponding to one item attribute modifies one or more previously selected item attribute values, in accordance with at least one embodiment. The user interface 800 may include expanded area 710 and carousel 712 as described above in FIG. 7. In some embodiments, user input indicating a scrolling action within carousel 712 can cause a graphical interface element corresponding to particular attribute value (e.g., "model 4") for the currently expanded area (e.g., expanded area 710) to be displayed. In some embodiments, if the particular attribute value is incompatible with previous selections (e.g., the model 4 smartphone is not manufactured in white e.g., as determined based at least in part on the item objects of the electronic catalog), the user may still be enabled to select the corresponding graphical interface element (e.g., graphical interface element 802. In some embodiments, currently selected data may be updated to indicate the currently selected attribute value (e.g., "model 2") as depicted at 804. Upon selecting the graphical interface element 802, the user interface 800 may transition to displaying the information as depicted in user interface 1000 of FIG. 1.

Figure 9:
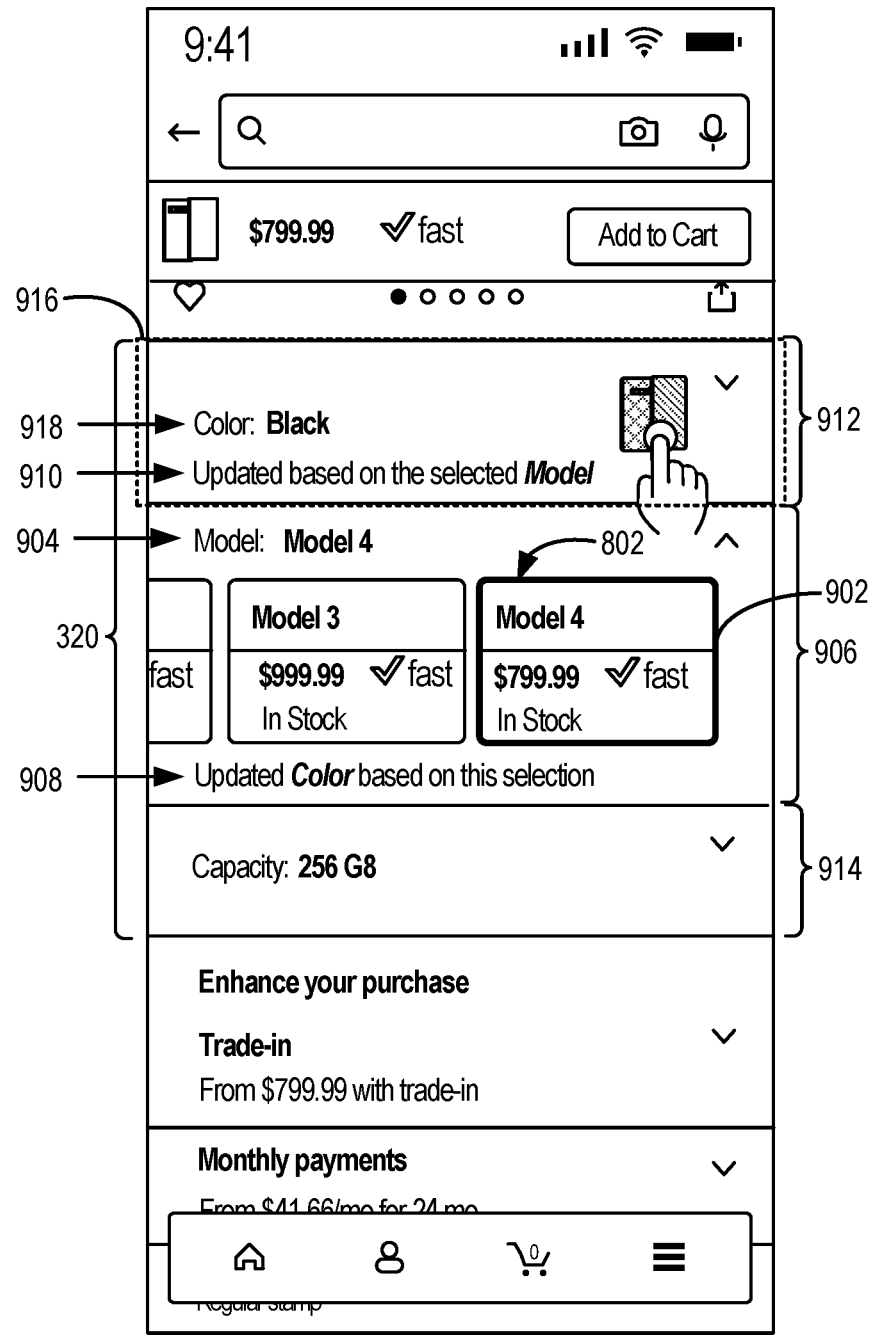
FIG. 9 depicts one or more notifications presented in response to user input, in accordance with at least one embodiment.

FIG. 9 depicts one or more notifications presented in response to user input, in accordance with at least one embodiment. In reference to the ongoing example, user interface 900 may be presented as depicted in response to receiving user input indicating a selection of graphical interface element 802 from user interface 800. Graphical interface element 802 may be updated as being surrounded by border 902 (or any suitable method of indicating that graphical interface element 802 is currently selected). In some embodiments, currently selected data may be updated to indicate the currently selected attribute value (e.g., "model 4") as depicted at 904.

When a selection is made via any suitable attribute area (e.g., attribute area 906 corresponding to the model attribute), a database storing objects/containers corresponding to various instances of the item may be queried to determine whether the most recent attribute value selection is compatible with the currently selected (potentially default) attribute values of the other attributes within item attribute area 320. If this query returns no item object including the particular combination of currently selected attribute values, one or more previously selected attribute values may be modified such that an item object having this modified combination of attribute values is determined to exist. In some embodiments, the particular protocol set (e.g., rules) for selecting one or more new attribute values for one or more other attributes may be predefined. In some embodiments, the system may identify a most commonly selected/procured item attribute for the attribute to be modified. As a non-limiting example, the system may determine, from past purchase information, that the item is most often ordered in black when the fourth model of the item is ordered. Thus, the color may be modified to black, the most often ordered color for that model. Alternatively, the attribute value may be determined based on account history associated with the user. For example, if it is determined that the user most often orders electronics (e.g., other items sharing a common category with the item currently being view), the color attribute may be updated with the color most often ordered by the user for items of that category (e.g., phones, electronics, etc.). Alternatively, the interface specification can define an order and/or preference between attribute values.

As a non-limiting example, upon determining that graphical interface element 802 has been selected, the system may incrementally evaluate the other attributes depicted within item attribute area 320. These attributes may be evaluated in any suitable order (e.g., an order specified in an interface specification 105 of FIG. 1 and associated with the network page and/or item identifier corresponding to item attribute area 320). For example, interface specification 105 may specify that attribute areas corresponding to attributes color, model, and capacity are to be displayed in that order. When a change is made to the model attribute value that conflicts with the previously selected and/or default values of the remaining attributes, these remaining attributes may be modified in the order defined in the interface specification 105. By way of example, as the color attribute is displayed first within item attribute area 320, the color attribute value may be evaluated first, before the attribute value corresponding to the capacity value (e.g., currently, 256 GB), in accordance with the order defined by the interface specification 105. The system may be configured to identify the next color attribute value for which an item having the selected attribute values (e.g., "model 4" for the model attribute and "256 GB" for the capacity attribute). The color attribute values may be evaluated in an order identified by the interface specification 105. By way of example, a search may be conducted for an item having the attributes color: blue, model: model 4, and capacity: 256 GB as "blue" was the first color listed for the color attribute. If such an item (e.g., an item object) corresponding to this combination of attribute values is not found, a next color may be evaluated. Since the color attribute value of "white" has already been determined to be incompatible with the model attribute value "model 4," the next color evaluated may be "black" in accordance with the color attribute value order specified in the interface specification 105.

If an item having the attributes color: black, model: model 4, and capacity: 256 GB is found, the user interface 900 may be updated with one or more notifications. By way of example, notification 908 may be presented within the attribute area 906 to indicate at least one attribute (e.g., color) for which the previously selected attribute value (e.g., white) has been modified (e.g., to black). Additionally, or alternatively, notification 910 may be presented within the attribute area 912 corresponding to the color attribute and collapsed area 706 of FIG. 7. The notification 910 may indicate, among other things, that the previously selected attribute value (e.g., white) was updated based on the user input selecting the currently selected value for another attribute (e.g., model). The example may be extended to a situation in which multiple attribute values corresponding to multiple respective attributes are updated. Although not depicted, should only one object exist with a model attribute having the value "model 4" which includes a color attribute with the value "black" and a capacity attribute value with the value of "128 GB," notification may be presented in both the attribute area 912 and the attribute area 914 to indicate the previously selected attribute values for those attributes were updated based at least in part on the selection made via attribute area 906. In some embodiments, the notification 908 in this example would indicate that both color and capacity were updated based on the selection made via attribute area 906 (e.g., selection of the graphical interface element 802).

In some embodiments, instead of providing notification 910 (or in addition to providing notification 910), a portion of attribute area 912 may be visually updated to indicate a different item attribute value was selected based at least in part on the selection of graphical element 802. By way of example, the area 916 may be colored and/or flash (e.g., flash green, flash red, etc.) to indicate a change has been made. This colorization/flashing may be applied to any attribute area corresponding to an item attribute value that has been changed due to the selection of graphical element 802. In some embodiments, the text 918 may be colorized and/or flash to indicate a change in item attribute value due to the selection of graphical element 802.

Figure 10:
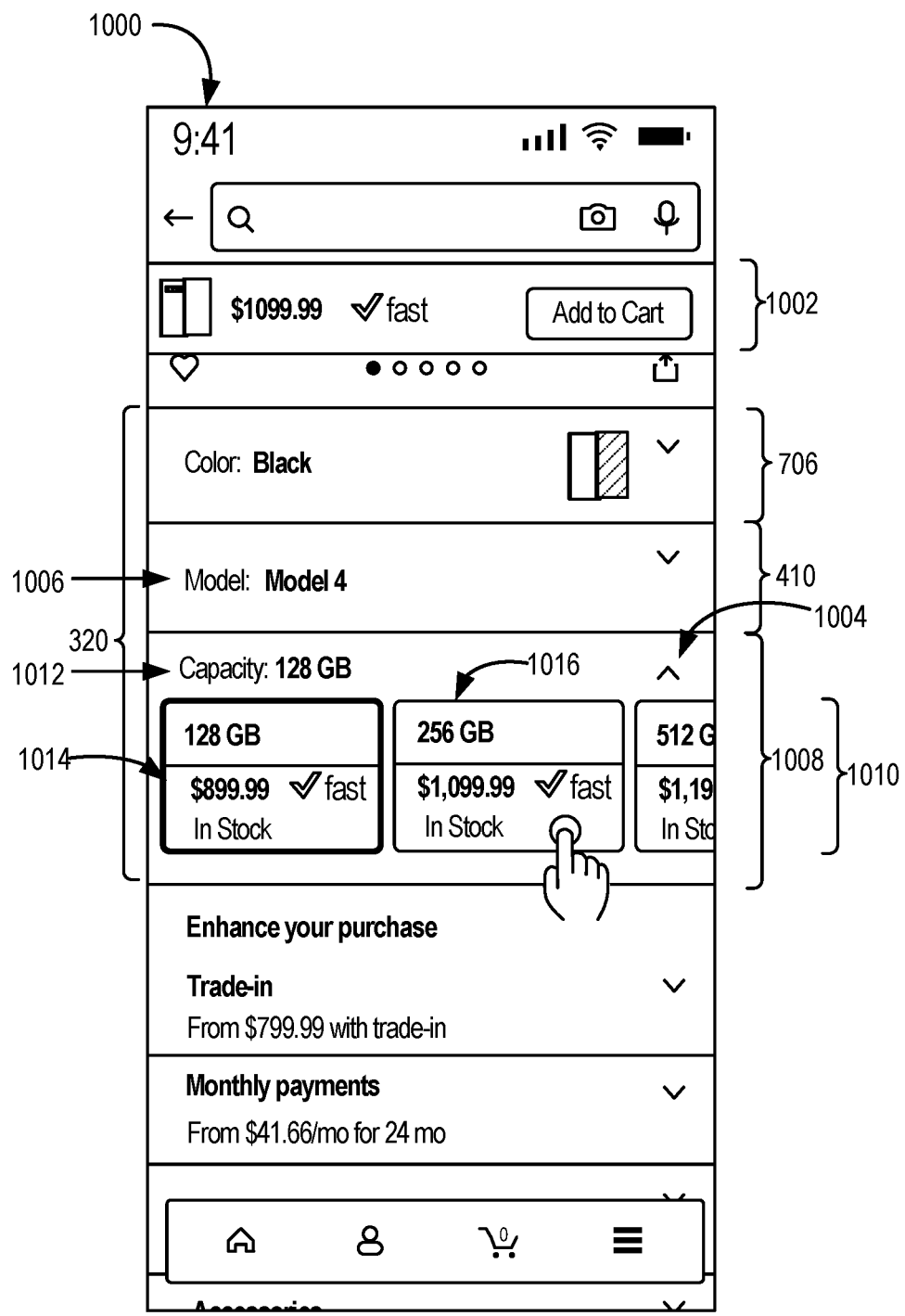
FIG. 10 is yet another example user interface for presenting yet another area that includes an expanded view of one or more values of yet another item attribute, in accordance with at least one embodiment.

FIG. 10 is yet another example user interface 1000 for presenting yet another area that includes an expanded view of one or more variations of yet another item attribute, in accordance with at least one embodiment. User interface 1000 is intended to corresponding to the user selecting graphical interface element 802 as discussed in connection with FIG. 9, resulting in an attribute value combination of color: black, model: acme model 4, and capacity: 128 GB. Upon selecting graphical interface element 802, currently selected data 1002 may be presented as an updated version of the attribute values and/or metadata corresponding to an item having the attribute values of the collective set of currently selected attribute values depicted within item attribute area 320 of FIG. 10.

At any suitable time, user input may be received within any suitable location of collapsed area 412 of FIGS. 4 and 7 (e.g., at user interface element 1004). Upon receiving such input, the user interface 1000 may transition from displaying the expanded area 710 of FIG. 7, to presenting collapsed areas 706 of FIG. 7 and, once again, collapsed area 410 of FIG. 4. The collapsed area 410 may be updated to present, at 1006, the currently selected attribute value (e.g., "Acme Model 4" as selected in the example of FIG. 9).

Also in response to receiving the user input at graphical interface element 802, the user interface 1000 may be used to transition from displaying the collapsed area 412 to presenting expanded area 1008 which may correspond to the same attribute as the collapsed area 410. Said another way, when a user selects the capacity attribute area 1008 depicted in FIG. 10, the previously collapsed view of the capacity attribute area may be expanded and the previously expanded view of the model attribute may be collapsed as depicted in FIG. 10. In some embodiments, user input indicating a request to expand any suitable attribute area with item attribute area 320 may cause any previously expanded attribute area to collapse.

The expanded area 1008 may also include a carousel 1010 and any suitable number of graphical interface elements corresponding to any suitable number of attribute values for the corresponding attribute (e.g., capacity). A currently selected value may be displayed at 1012. Initially, the currently selected value may display a default value (e.g., "128 GB") as defined by the interface specification (e.g., the interface specification 105 of FIG. 1) and/or by position of a set of attribute values within an object associated with an item identifier associated with the network page. Graphical interface element 1014 may initially be selected (as indicated by a border, text color, background color, or the like) as corresponding to the currently selected attribute value. As described in the figures above, the user may scroll left or right within the carousel 1010 to view the various attribute values available for the item.

In some embodiments, user input may be received that indicates a selection of the graphical interface element 1016 corresponding to a capacity attribute value of "256 GB." In response to this user input, the currently selected value presented at 1012 may be updated to present "256 GB" as the currently selected attribute value. Likewise, the currently selected data 1002 may be updated to present attribute values and/or metadata corresponding to the currently selected values of the combined set of attributes (e.g., color, model, and capacity, in this example).

Figure 11:
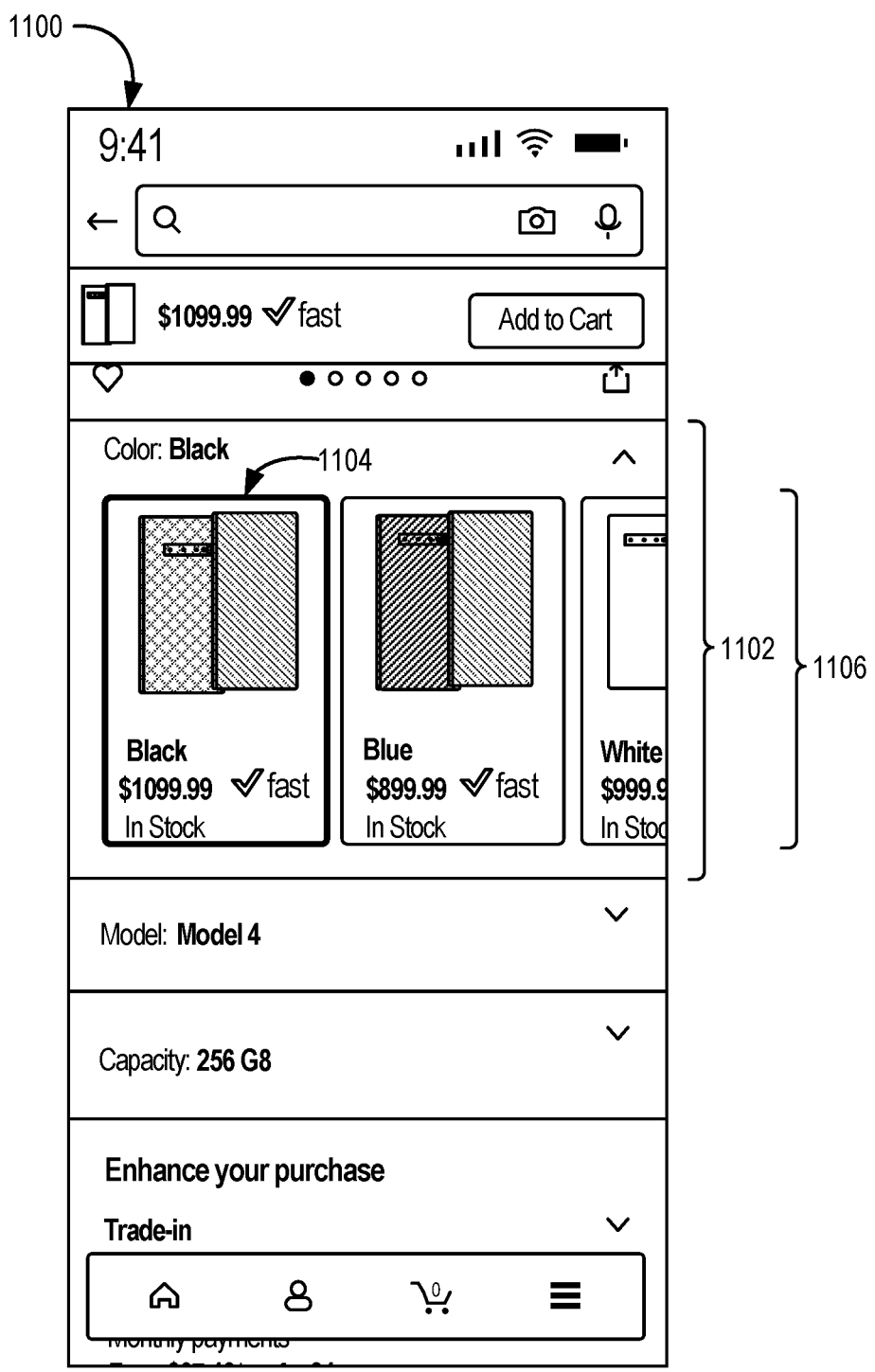
FIG. 11 depicts a user interface that presents an expanded area that includes graphical interface elements that have been sorted based at least in part on a previous user selection, in accordance with at least one embodiment.

FIG. 11 depicts a user interface 1100 that presents an expanded area 1102 that includes graphical interface elements that have been sorted based at least in part on a previous user selection, in accordance with at least one embodiment. User interface 1100 is intended to depict an expanded area 1102 that corresponds to the expanded area 408 of FIG. 4 and after the user input described in connection with FIG. 10 (e.g., the selection of graphical interface element 1016) is received. In some embodiments, the graphical interface elements of the expanded area 408 may be resorted such that the selected graphical interface element (e.g., graphical interface element 1104 corresponding to the graphical interface element 802 of FIG. 8) is presented in a prominent position within carousel 1106 (e.g., at a first position within the carousel 1106). The remaining graphical interface elements within the expanded area 1102 may be presented in the order defined within an interface specification (e.g., interface specification 105 of FIG. 1) associated with the item category and/or network page on which the graphical interface elements are presented.

Figure 12:
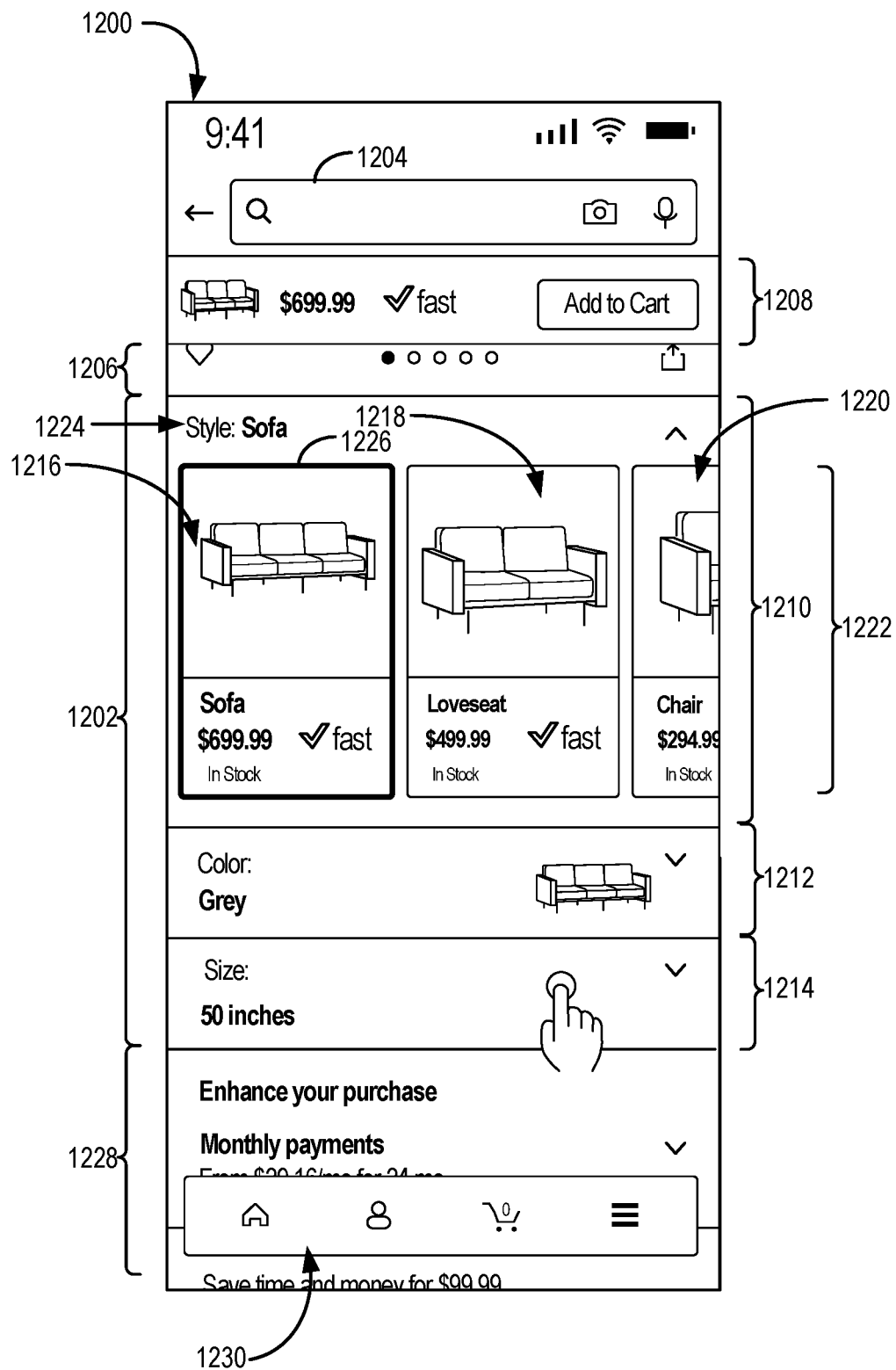
FIG. 12 is another example user interface for presenting an attribute that includes an expanded view of one or more values of an item attribute, in accordance with at least one embodiment.

FIG. 12 is an example user interface 1200 for presenting an item attribute area 1202 that includes an expanded view 402 (e.g., an example of the expanded area 108 of FIG. 1) of one or more variations of an item attribute, in accordance with at least one embodiment. User interface 1200 may be presented subsequent to receiving user input that indicates a user has scrolled downward within the network page associated with an item of furniture.

Search bar 1204 may be utilized to enter a search query at any suitable time. Search bar 1204 may be configured to be positioned at the top of user interfaces 1200, irrespective of any scrolling action provided via user input and will not be mentioned again for brevity. In response to receiving a scrolling input indicating the user has navigated to a position within the network page that is no longer aligning with a top boundary of the network page (not depicted), the heading information 1206 (similar to the heading information 306 of FIG. 3 but pertaining to the furniture item) and item attribute area 1202 may be scrolled upward within the user interface 1200.

In some embodiments, upon determining that the user has navigated to a position within the network page that is no longer aligning with the top boundary of the network page, current selection data area 1208 may be positioned/docked at the top boundary of the network page. Current selection data area 1208 may initially display information for an item that has attributes corresponding to a default attribute set as defined in an interface specification associated with the item and/or item category of the item (e.g., the interface specification 105 of FIG. 1). In some embodiments, the interface specification may specify a default value for any suitable number of attributes in any suitable manner. By way of example, the default value may be explicitly defined in the interface specification or inferred based on an order of attribute values associated with the item (with the default value being the first, for example, in the list of possible attribute values). If user input is received selecting one or more graphical interface elements corresponding to different attribute values, the current selection data area 1208 may be updated to present any suitable information associated with an item having the attribute values selected. Current selection data area 1208 may be similar to the current selection data area 402 of FIG. 2 and may present similar information but pertaining to the attribute values currently selected within item attribute area 1202. Any suitable metadata corresponding to the currently selected attribute values may be displayed within current selection data area 1208 and may include any suitable combination of item attributes including, but not limited to, price, shipping speed, an image of the item having the default or selected attributes, an availability, a rating, a number of reviews, or any suitable data associated with an item from the electronic catalog. In some embodiments, the current selection data area 1208 may include an option for adding an item corresponding to the currently selected (and/or default) item attributes to a digital cart (e.g., a digital shopping cart, a digital wish list, etc.). In some embodiments, the digital cart may be associated with a profile and/or account of the user such that the items contained in the cart may persist until one of a particular set of actions has occurred (e.g., the user completes an order for the item, the user deletes the item from the digital cart, etc.).

Item attribute area 1202 may include one expanded area (e.g., an attribute area such as expanded area 1210) within which one or more variations of an attribute (here, style) are depicted. In some embodiments, only one expanded area may be displayed at a time. For example, expanded area 1210 may be initially presented on an interface specification associated with the network page and/or item while collapsed areas 1212 and 1214 (corresponding to attributes color and size, respectively) are presented in a collapsed view. In some embodiments, the interface specification associated with the furniture item or the item category associated with the furniture item may specify an order by which multiple attribute areas are presented. As a non-limiting example, the interface specification associated with the network page depicted in FIG. 12 may specify that attribute areas corresponding to style, color, and size are to be presented in that order. In some embodiments, various attributes associated with the item may be specified within the interface specification as being associated with a visual dimension and/or component or not being associated with a visual dimension and/or component. In some embodiments, attribute areas corresponding to attributes which are specified as being associated with a visual dimension and/or component may be prioritized and positioned within the network page above attribute areas corresponding to attributes which are not associated with a visual dimension and/or component. In some embodiments, the interface specification for a given network page may be associated with an item identifier and/or an item category. By way of example, items corresponding to a common item category (e.g., electronics, clothing, perishables, televisions, and the like) may share a common interface specification. This may enable a unified presentation of the various network pages corresponding to items which share a category.

The expanded area 1210 may include one or more graphical interface elements. These graphical interface elements may correspond to options to select one of the attribute variations (e.g., different values of the given attribute such as the attribute values "sofa," "loveseat," "chair," etc., for the attribute "style"). In some embodiments, a subset or all of the total number of graphical interface elements may be viewable initially. By way of example, graphical interface elements 1216-1220 (or any suitable number of graphical interface elements) may be presented within expanded area 1210. Collapsed areas 1212 and 1214 may correspond to a respective attribute for which a default value alone is presented.

In some embodiments, the expanded area 1210 includes a carousel 1222 within which one or more graphical interface elements (e.g., graphical interface elements 1216-1220) is displayed, each corresponding to a unique attribute variation/value. In some embodiments, at least some portion of one or more graphical interface elements corresponding to one or more item attribute variations may be initially hidden and/or only partially viewable within the expanded area 1210. Carousel 1222 can be horizontally scrollable such that the user may use an input device (e.g., a mouse, a finger, a stylus, etc.) to scroll to the right and/or left. In some embodiments, such as when the user is using a touch input device, the user may swipe to the left or right in order to scroll to the right or left within the carousel 1222 to present various combinations of the variations (e.g., sofa, loveseat, chair) available for that attribute (e.g., style).

In some embodiments, an expanded view of an item attribute (e.g., expanded area 1210) includes an indication of a default value or currently selected for the item attribute at 1224 and at least one graphical interface element corresponding to an attribute variation. In some embodiments, each graphical interface element may present metadata (e.g., any suitable combination of price, shipping speed, availability, rating, number of reviews, discount, shipping time, and/or the like) associated with the item. The particular metadata that is presented within each graphical interface element may be configurable In some embodiments, this metadata may include at least one visual representation. By way of example, graphical interface element 1226 may include an image of the item representing a corresponding attribute variation such as the sofa style of the furniture item.

In some embodiments, a default value for the style attribute may be presented within the expanded area 1210 at 1224 and a graphical interface element (e.g., graphical interface element 1216) corresponding to the default value for the color attribute may be initially selected. As described herein, the particular order and/or the default value for the various attribute values may be specified in the interface specification associated with the item and/or item category. In some embodiments, the order of the attribute values may be determined by an order associated with attribute values as identified within an object that serves as a storage container for the attributes of the item. In some embodiments, the object may be obtainable based at least in part on retrieving an item corresponding to an item identifier associated with the network page. In some embodiments, any suitable number of the graphical interface elements 1216-1220 may include an image of the item that is unique to the attribute value and which differs from the other images presented in the other graphical interface element.

In some embodiments, the graphical interface element 1216, corresponding to the default value for the style attribute may be visually distinct (e.g., presented with a bolder edge, presented with a different color text and/or background, etc.) from the other graphical interface elements of expanded area 1210. In some embodiments, the graphical interface elements 1216-1220 may be positioned and/or sorted such that the graphical interface elements corresponding to the default value (and/or the currently selected variation) is presented in a first position (e.g., in this case, a left-most position within the expanded area 1210). In some embodiments, the carousel 1222 may be configured to be circular as similarly described above in connection with FIG. 1. The graphical interface elements 1216-1220 may provide any suitable metadata associated with the item. The specific metadata provided within the graphical interface elements 1216-1220 may be predefined and/or specified within an interface specification associated with the item and/or item category of the item.

In some embodiments, a currently selected value (by virtue of user selection or from being assigned as a default value for the color attribute within an interface specification that defines expanded area 408) may be depicted using a border as depicted with graphical interface element 1226 within carousel 1222.

Collapsed areas 1212 and 1214 may be presented in a collapsed view in which all but one variation (e.g., initially the default value) associated with a respective item attribute is hidden from view. In some embodiments, only a single attribute variation/value (e.g., "Grey" and "50 inches," respectively) is displayed within a collapsed view regardless of whether other variations of that attribute are hidden and/or exist.

In some embodiments, additional data (e.g., purchase options 1228) may be presented via the network page. The additional data may be presented at a position below the item attribute area 320. The user interface 1200 may include navigation bar 1230, which can be similar to the navigation bar 326 described above in connection with FIG. 3

Figure 13:
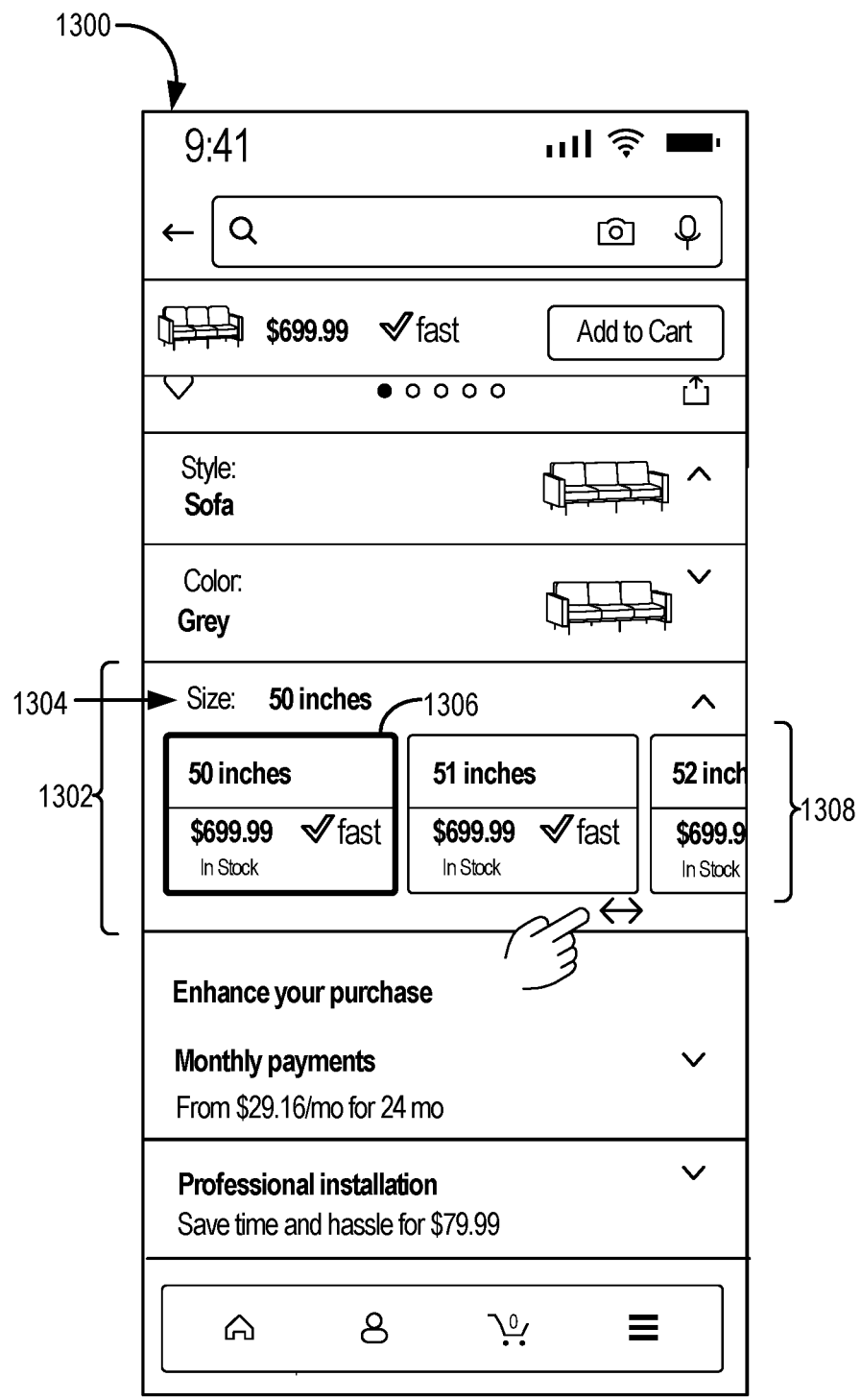
FIG. 13 depicts an expanded item attribute area that is horizontally scrollable, in accordance with at least one embodiment.

In some embodiments, the user may select collapsed area 1214 to expand the collapsed area 1214. Expanding the collapsed area 1214 may cause the expanded area 1210 to collapse such that the carousel 1222 and graphical interface elements 1216-1220 are no longer visible. FIG. 13 depicts the visual results of receiving user input indicating a selection of the collapsed area 1214.

FIG. 13 depicts an expanded item attribute area 1302 (an expanded attribute area corresponding to the collapsed area 1214 of FIG. 12) that is horizontally scrollable, in accordance with at least one embodiment. User interface 1300 may include only one horizontally scrollable area at a given time. As expanded, the expanded item attribute area 1302 may depict a default (or currently selected) attribute value at 1304 and a set of graphical interface elements. A graphical interface element 1306 corresponding to the default/currently selected attribute value may be bordered or otherwise visually distinct from the remaining graphical interface elements of the set. The number of graphical interface elements displayed via the expanded item attribute area 1302 (e.g., via a carousel 1308) may not correspond to the total number of attribute values available.

The number and/or order of the graphical interface elements displayed within the carousel 1308 may be predefined (e.g., preset and/or specified in an interface specification corresponding to the item/item category). As a non-limiting example, the interface specification or a predefined threshold may be identified which indicates a largest number of attribute values to be represented within the carousel 1308. By way of example, although 20 attribute values may be possible for a given attribute (e.g., size), only ten attribute values may be selectable via graphical interface elements within the carousel 1308. The user may horizontally scroll through these graphical interface elements within the carousel 1308.

Figure 14:
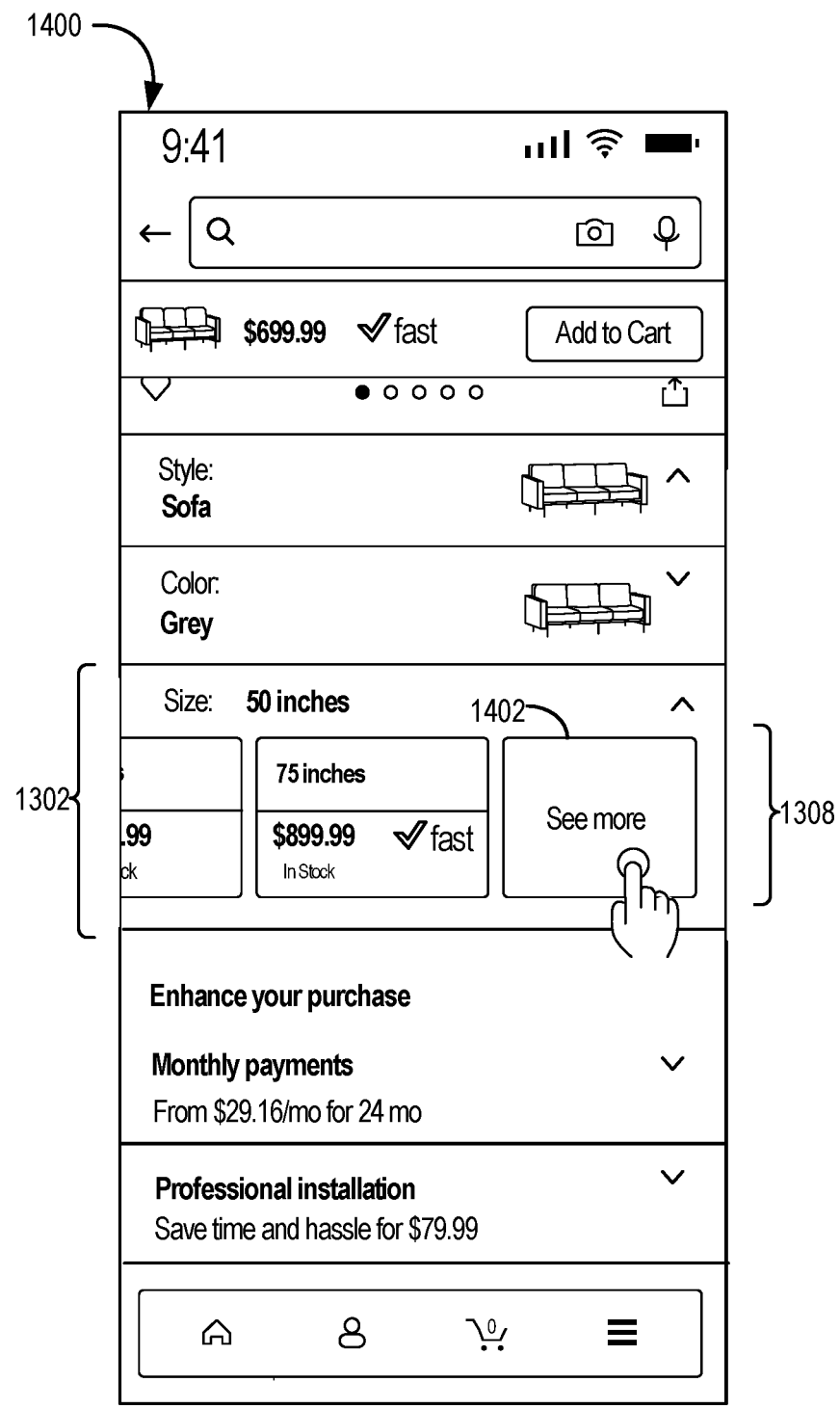
FIG. 14 depicts a user interface having an ingress point for viewing additional item attribute values, in accordance with at least one embodiment.

FIG. 14 depicts a user interface 1400 having an ingress point 1402 for viewing additional item attribute variations, in accordance with at least one embodiment. The ingress point 1402 may also be provided within the carousel 1308. In some embodiments, the ingress point 1402 may be an additional graphical interface element that immediately follows the last graphical interface element displayed within the carousel 1308. Continuing with the ongoing example, if 20 attribute values exist and only 10 of those attribute values are to be represented by graphical interface elements within the carousel 1308, the ingress point 1402 may be included in the carousel 1308 to enable the user to access the full list of attribute value.

Figure 15:
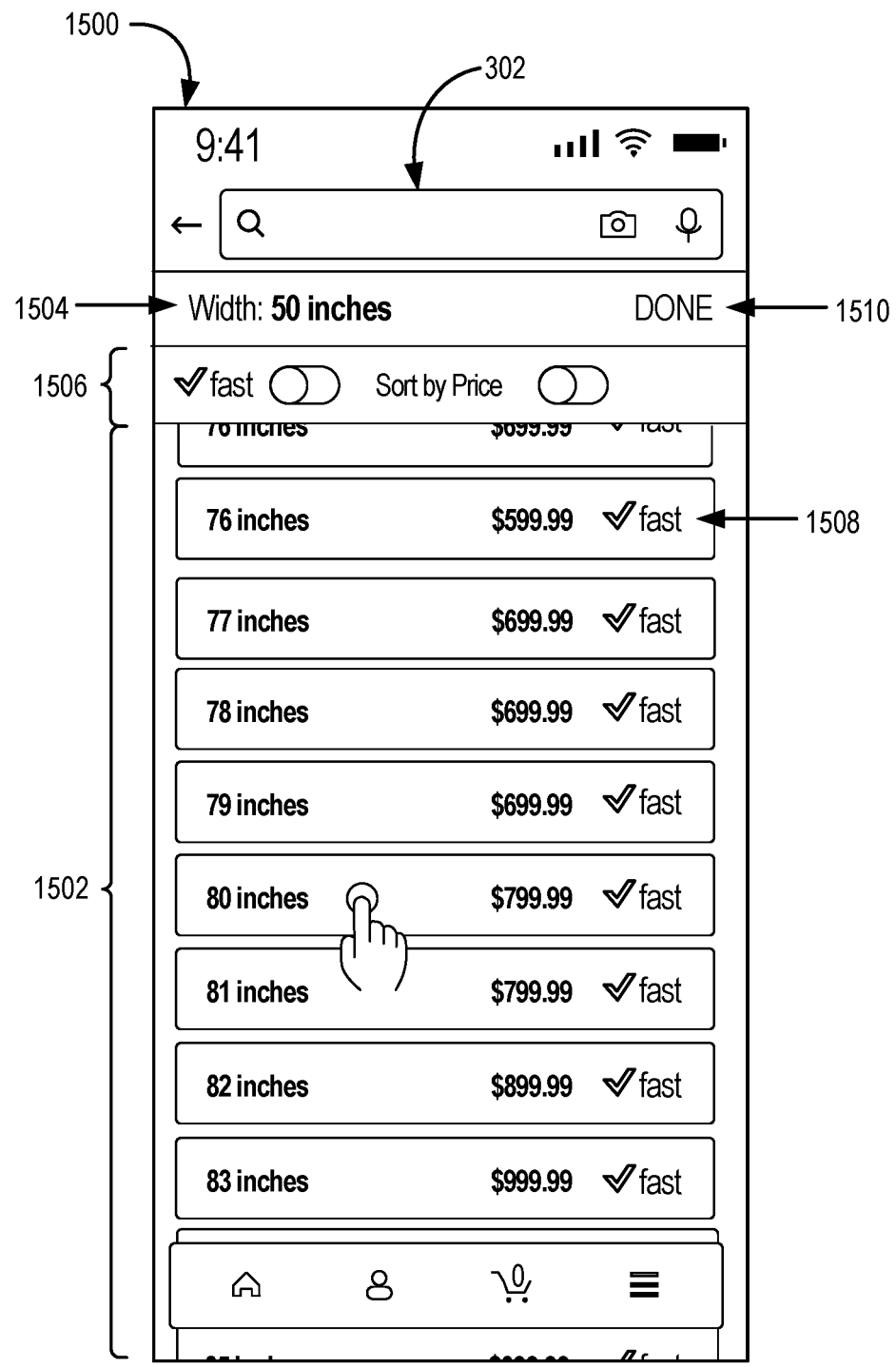
FIG. 15 depicts an example user interface for viewing additional item attribute values, in accordance with at least one embodiment.

FIG. 15 depicts an example user interface 1500 for viewing additional item attribute variations, in accordance with at least one embodiment. User interface 1500 may be displayed following user input indicating a selection of the ingress point 1402 of FIG. 14. In some embodiments, the user interface 1500 may correspond to a separate network page associated with the item from which any suitable number (e.g., the total number) of attribute values for a given attribute (e.g., size) may be presented. The user interface 1500 may include an attribute value area 1502 which may be scrollable such that the user may access the available attribute value. A currently selected (potentially default) attribute value may be presented at 1504. In some embodiments, any suitable number of options for filtering and/or sorting the attribute values within attribute value area 1502 may be included in area 1506. Any selection of an option with area 1506 may cause the attribute values presented within attribute value area 1502 to be updated based on the option selects (e.g., to present a filter list when a filtered option is selected, to display a sorted list when a sorted option is selected).

Any suitable number of graphical interface elements (e.g., the graphical interface element 1508) may be presented within attribute value area 1502. Like the graphical interface elements discussed in the above figures, each graphical interface element of user interface 1500 may be presented with any suitable metadata corresponding to an item associated with that attribute. By way of example, each attribute value may be presented with a price and shipping speed corresponding to an item with that attribute value. When user interface 1500 is initially presented, a graphical interface element corresponding to a currently selected attribute value (as indicated at 1504) may be selected (presented in a visually distinct manner such as by using a border, different text color, different background color, or the like). The user may, at any suitable time, select egress point 1510 to return to the user interface 1400 of FIG. 14. Any graphical interface element selected via the user interface 1500 may be utilized to update the currently selected attribute value within the item attribute area 1302 of FIG. 14. While the user interface 1500 is displayed, selection of any suitable graphical interface element within the attribute value area 1502 may be utilized to update the currently selected attribute value presented at 1504.

Figure 16:
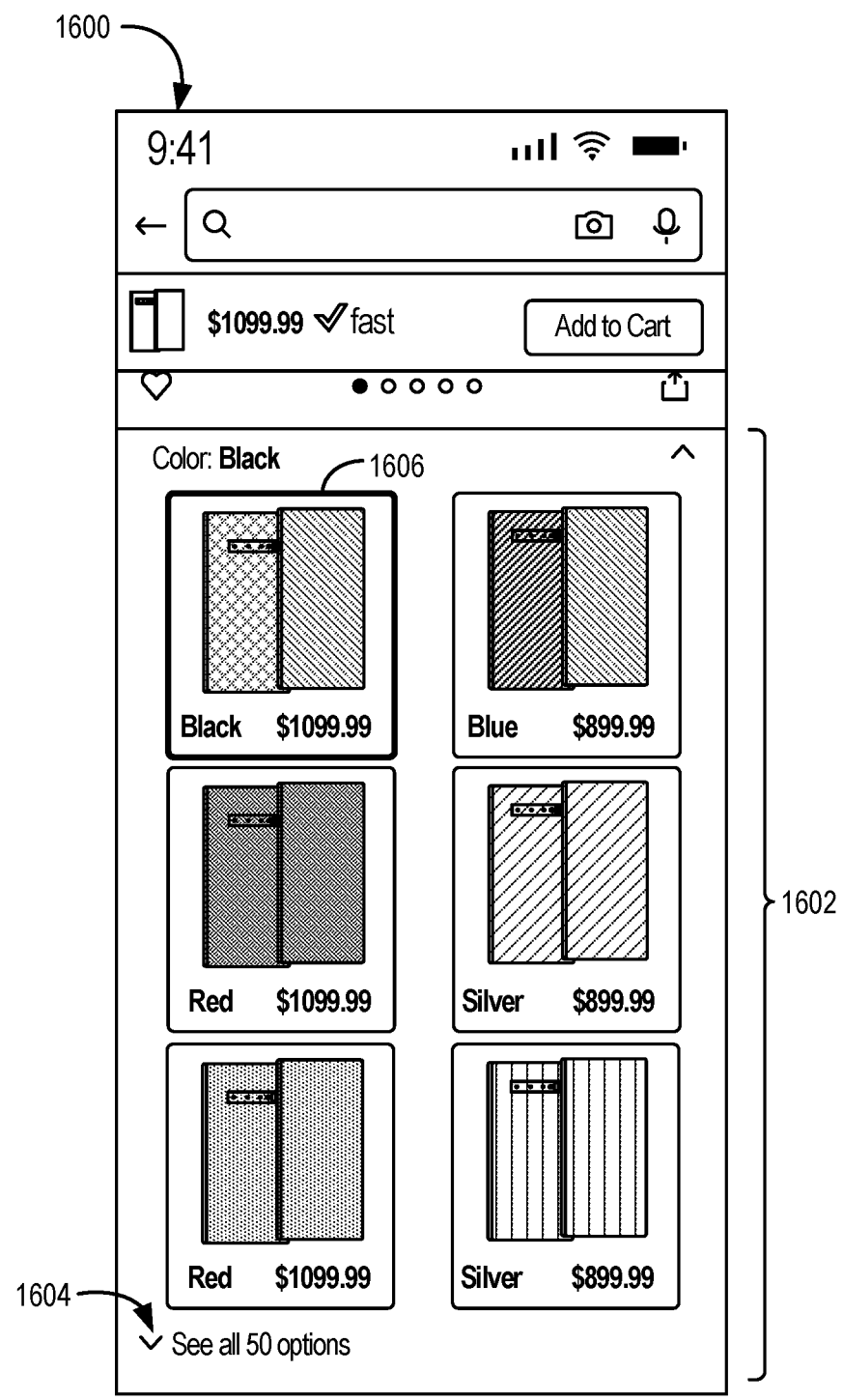
FIG. 16 depicts another example user interface for viewing additional item attribute values, in accordance with at least one embodiment.

FIG. 16 depicts another example user interface 1600 for viewing additional item attribute values, in accordance with at least one embodiment. Although examples herein describe some item attribute areas as being horizontally scrollable, it should be appreciated that in some embodiments, these item attribute areas may be horizontally and/or vertically scrollable. FIG. 16 depicts an example item attribute area 1602 which presents multiple rows of item attribute values. The item attribute area 1602 is intended to depict an item attribute area in which a number of item attribute values are provided in line (e.g., within the item attribute area 1602. In some embodiments, graphical element 1604 may be provided to expanded item attribute area 1602 to include an additional number of item attribute values (e.g., all 50 attribute values). As another example, the graphical element 1604 selection may cause the item attribute area 1602 to expand to include an additional number of item attribute values to be provided that is less than the total number (e.g., less than a first threshold number, for example, 25 item attribute values). If the item attribute area 1602 is expanded, an additional graphical element (not depicted but similar to graphical element 1604) may be provided (e.g., at the bottom of the expanded version of item attribute area 1602) to view even more additional item attribute values. The item attribute area 1602, as expanded, may be configured to be vertically scrollable. In some embodiments, the graphical element 1604 (or the additional graphical element within the expanded version of the item attribute area) may be selected to view all of the item attribute values available. In some embodiments, selection of the graphical element 1604 (or the additional graphical element within the expanded version of the item attribute area) may be selected to transition to the user interface 1700. The user interface 1700 may be overlaid over user interface 1600, or the user interface 1700 may be provided via a different network page than the user interface 1600. The specific layout (e.g., vertical and/or horizontally arranged, a number of rows and/or columns, etc.) of the graphical elements (e.g., graphical element 1606) of FIG. 16 may be specified in the interface specification discussed herein. Similarly, the specific number of graphical elements to be initially presented within item attribute area 1102, as well as the specific number of graphical elements to be added (or a transition to user interface 1700) upon selection of graphical element 1604 can likewise be specified within the interface specification.

Figure 17:
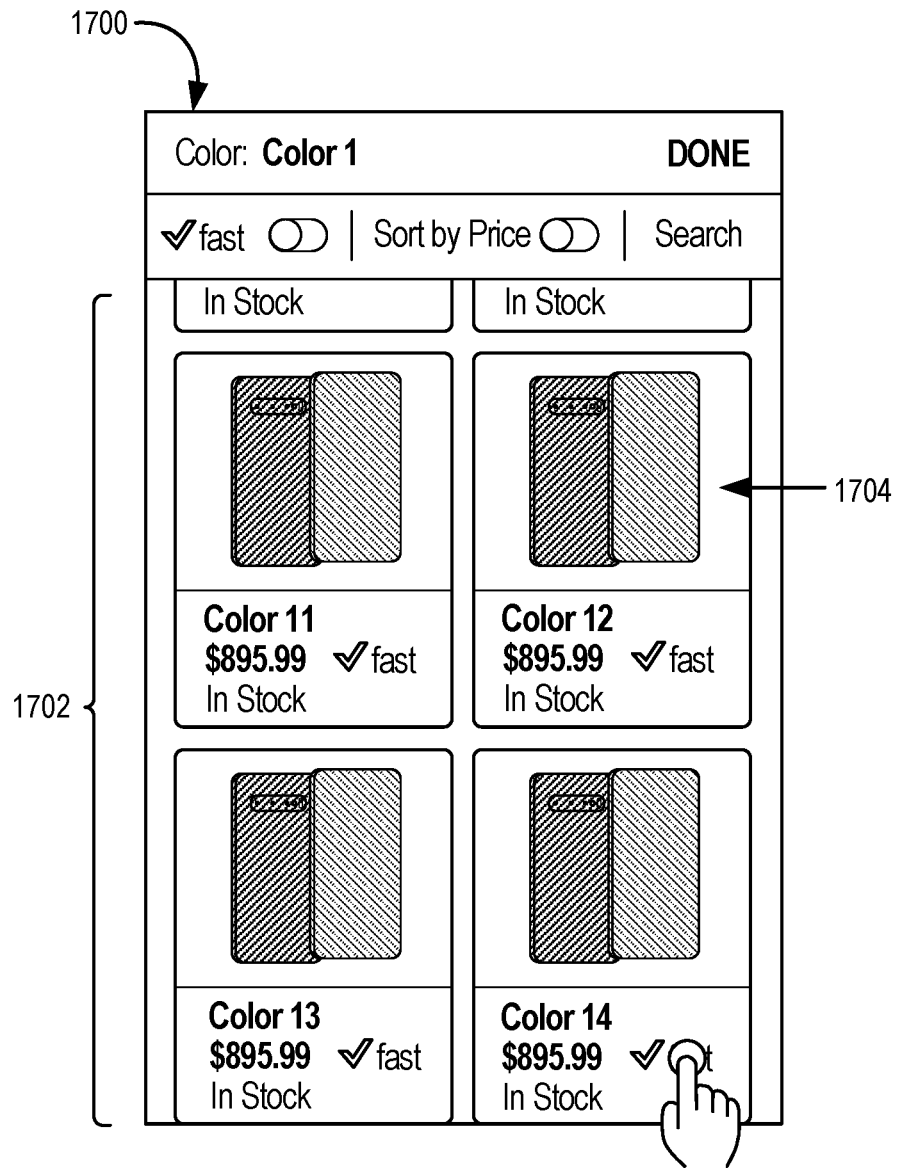
FIG. 17 depicts yet another example user interface for viewing additional item attribute values, in accordance with at least one embodiment.

FIG. 17 depicts yet another example user interface 1700 for viewing additional item attribute values, in accordance with at least one embodiment. The user interface 1700 may be similar in nature to the user interface 1500 and may include similar features as those discussed above in connection with FIG. 15. For example, the user interface 1700 may include attribute value area 1702 in which any suitable number of graphical interface elements (e.g., graphical interface element 1704) may be provided. As described above, the particular format and content of each graphical element presented within attribute value area 1702 may be specified within an interface specification associated with the item and/or item category and, in some cases, may depend on the particular attribute selected. Thus, the graphical interface element of FIG. 17 (e.g., graphical interface element 1704) may or may not have the same format and metadata as the graphical interface element 1508 of FIG. 15 depending on the particular specification information included in the interface specification for each corresponding attribute (in this example, for the size and color attributes).

Figure 18:
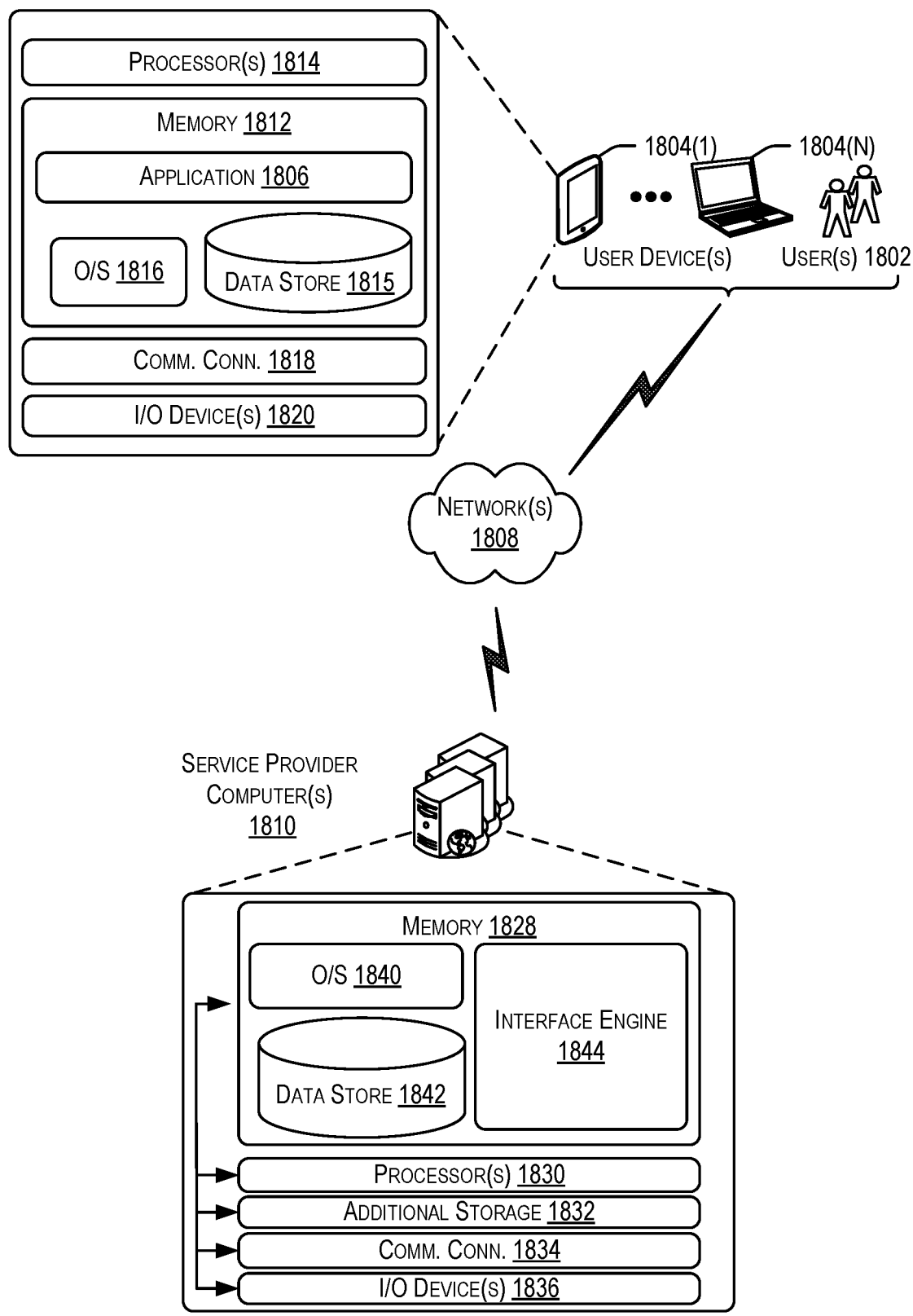
FIG. 18 is a schematic diagram of an example computer architecture for a content management engine, including a plurality of modules that may perform functions in accordance with at least one embodiment.

FIG. 18 illustrates components of a system 1800 according to a particular embodiment. In system 1800, one or more users 1802 may utilize a user device (e.g., a user device of a collection of user devices 1804(1)-(N) (collectively, user devices 1804). For example, the user(s) 1802 may access a user interface accessible through an application 1806 (e.g., a web browser, an application configured to render user interfaces provided by the interface engine 1844) running on the user devices 1804 via one or more networks 1808. In some aspects, the application 1806 operating on the user devices 1804 may provide content that can be hosted, managed, and/or provided by a computing resources service or service provider, such as by utilizing one or more service provider computer(s) 1810. The user(s) 1802 may be provided various graphical user interface elements such as those described in connection to the figures above. In some embodiments, user input provided via these user interfaces may be transmitted by the application 1806 to the interface engine 1844, operating as part of service provider computer(s) 1810.

In some examples, the networks 1808 may include any one or a combination of many different types of networks, such as cable networks, the Internet, wireless networks, cellular networks, and other private and/or public networks. While the illustrated example represents the users 1802 accessing application functionality over the networks 1808, the described techniques may equally apply in instances where the users 1802 interact with the service provider computer(s) 1810 via the one or more user devices 1804 over a landline phone, via a kiosk, or in any other suitable manner. It should be appreciated that the described techniques may apply in other client/server arrangements, as well as in non-client/server arrangements (e.g., locally stored applications, etc.).

The service provider computer(s) 1810, perhaps arranged in a cluster of servers or as a server farm, may host the application 1806 operating on the user devices 1804 and/or cloud-based software services. Other server architectures may also be used to host the application 1806 and/or cloud-based software services. The application 1806 (e.g., a shopping application, a web browser, etc.) operating on the user devices 1804 may be capable of handling requests from the users 1802 and serving, in response, various user interfaces that can be rendered at the user devices 1804. The application 1806 operating on the user devices 1804 can present any suitable type of interface that supports user interaction, including search interfaces, interfaces with which an audio segment can be defined, playback interfaces, and the like.

The user devices 1804 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user devices 1804 may be in communication with the service provider computer(s) 1810 via the networks 1808, or via other network connections.

In one illustrative configuration, the user devices 1804 may include at least one memory 1812 and one or more processing units (e.g., processor(s) 1814). The processor(s) 1814 may be implemented as appropriate in hardware, computer-executable instructions, firmware, or combinations thereof. Computer-executable instruction or firmware implementations of the processor(s) 1814 may include computer-executable or machine-executable instructions written in any suitable programming language to perform the various functions described.

The memory 1812 may store program instructions that are loadable and executable on the processor(s) 1814, as well as data generated during the execution of these programs. Depending on the configuration and type of user computing device, the memory 1812 may be volatile (such as random access memory (RAM)) and/or non-volatile (such as read-only memory (ROM), flash memory, etc.). The user devices 1804 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1812 may include multiple different types of memory, such as static random access memory (SRAM), dynamic random access memory (DRAM), or ROM.

Turning to the contents of the memory 1812 in more detail, the memory 1812 may include an operating system 1816, one or more data stores 1815, and one or more application programs, modules, or services for implementing the techniques disclosed herein, provided via the application 1806. The application 1806 may be configured to receive, store, and/or display a network page or other interface for interacting with the service provider computer(s) 1810. Additionally, the memory 1812 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user devices 1804 may also contain communications connection(s) 1818 that allow the user devices 1804 to communicate with a stored database, another computing device or server (e.g., the service provider computer(s) 1810), user terminals and/or other devices on the networks 1808. The user devices 1804 may also include I/O device(s) 1820, such as a keyboard, a mouse, a pen, a voice input device, a touch input device, a display, speakers, a printer, etc.

In some aspects, the service provider computer(s) 1810 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 1810 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 1810 may be in communication with the user devices 1804 and/or other service providers via the networks 1808 or via other network connections. The service provider computer(s) 1810 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 1810 may include at least one memory 1828 and one or more processing units (e.g., processor(s) 1830). The processor(s) 1830 may be implemented as appropriate in hardware, computer-executable instructions, firmware, or combinations thereof. Computer-executable instruction or firmware implementations of the processor(s) 1830 may include computer-executable or machine-executable instructions written in any suitable programming language to perform the various functions described.

The memory 1828 may store program instructions that are loadable and executable on the processor(s) 1830, as well as data generated during the execution of these programs. Depending on the configuration and type of service provider computer(s) 1810, the memory 1828 may be volatile (such as RAM) and/or non-volatile (such as ROM, flash memory, etc.). The service provider computer(s) 1810 or servers may also include additional storage 1832, which may include removable storage and/or non-removable storage. The additional storage 1832 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1828 may include multiple different types of memory, such as SRAM, DRAM, or ROM.

The memory 1828, the additional storage 1832, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 1828 and the additional storage 1832 are all examples of computer storage media. Additional types of computer storage media that may be present in the service provider computer(s) 1810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 1810. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 1810 may also contain communications connection(s) 1834 that allow the service provider computer(s) 1810 to communicate with a stored database, another computing device or server, user terminals and/or other devices on the networks 1808. The service provider computer(s) 1810 may also include I/O device(s) 1836, such as a keyboard, a mouse, a pen, a voice input device, a touch input device, a display, speakers, a printer, etc.

Turning to the contents of the memory 1828 in more detail, the memory 1828 may include an operating system 1840, one or more data stores 1842, and/or one or more application programs, modules, or services (e.g., the interface engine 1844) for implementing the features disclosed herein.

Figure 19:
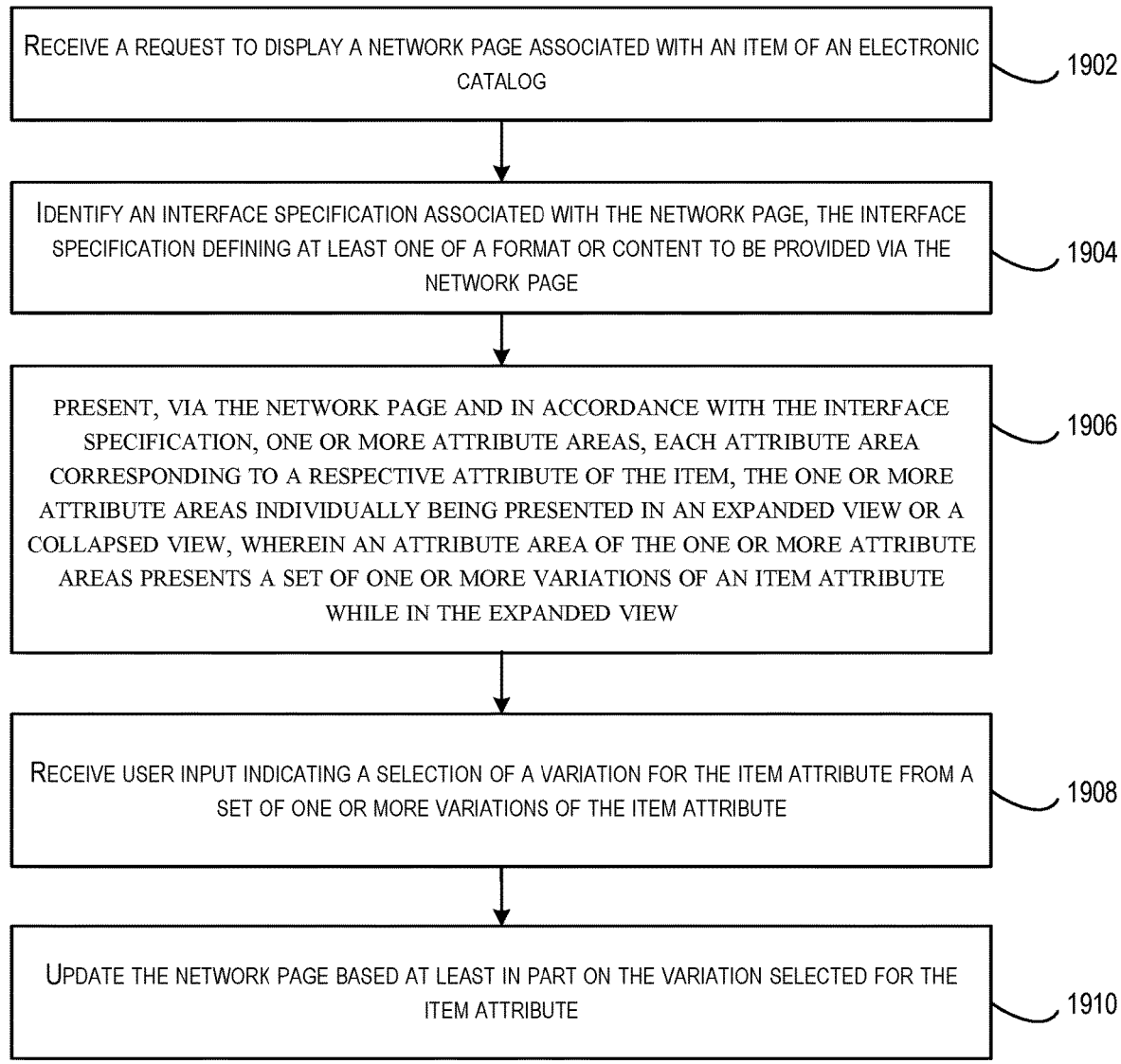
FIG. 19 is a flowchart illustrating an example method for presenting attribute variations at a user interface, in accordance with at least one embodiment.

FIG. 19 is a flowchart illustrating an example method 1900 for presenting attribute variations at a user interface (e.g., at a network page associated with an item), in accordance with at least one embodiment. A computing device comprising one or more processors and one or more computer-readable mediums (e.g., one or more memories) may be utilized. A computer-readable medium may store computer-executable instructions that, when executed by at least one processor, cause at least one computer to perform instructions comprising the operations of the method 1900. It should be appreciated that the operations of the method 1900 may be performed in any suitable, not necessarily the order depicted in FIG. 19. Further, the method 1900 may include additional, or fewer operations than those depicted in FIG. 19. The operations of method 1900 may be performed by any suitable combination of the user device(s) 1804 of FIG. 18 and/or the service provider computer(s) 1810 of FIG. 18.

The method 1900 may begin at 1902, where a request to display a network page associated with an item of an electronic catalog is received. As a non-limiting example, a network page corresponding to an item such as a smartphone may be received. The smartphone may be associated with various attributes, each of which may correspond to a respective set of possible attribute values/variations.

At 1904, an interface specification (e.g., interface specification 105 of FIG. 1) that is associated with the network page (or the smartphone itself via virtue of an item identifier) is identified. In some embodiments, the interface specification defines and/or specifies at least one of a format or content to be provided via the network page. As a non-limiting example, an interface specification for a network page may define an item attribute area that presents one or more attribute areas corresponding to one or more attributes of the item. The number, type, placement, order, or any suitable attribute area may be specified by the interface specification. In some embodiments, aspects of the graphical interface elements presented within these attribute areas may be specified by the interface specification. For example, an order of the graphical interface elements (and/or an order of the possible attribute values) may be specified by the interface specification. A maximum number of graphical interface elements to be provided within the attribute area may be specified by the interface specification. The interface specification may define what metadata and in what format this metadata is provided at a graphical interface element. In some embodiments, the interface specification may define different metadata and/or formats for graphical interface elements of differing attribute areas. In some embodiments, the interface specification may specify default values for one or more attributes to be presented within the item attribute area. In some embodiments, the interface specification may define an egress point to navigate to a separate network page from which an entire set of attribute values corresponding to a particular attribute can be viewed. In general, the interface specification can be used to specify any suitable aspect of any suitable data, attribute, element, or content of an item attribute area.

At 1906, one or more attribute areas (e.g., the expanded area 408 of FIG. 4, the collapsed areas 410 and 412 of FIG. 4, the expanded area 710 of FIG. 7, etc.) are presented via the network page and in accordance with the interface specification. In some embodiments, the one or more attribute areas are individually presented in an expanded view or a collapsed view in accordance with the interface specification. In some embodiments, an attribute area of the one or more attribute areas presents a set of one or more variations of an item attribute while in the expanded view.

At 1908, user input indicating a selection of a variation for the item attribute from a set of one or more variations of the first attribute is received. By way of example, the user may select graphical interface element 416 of FIG. 4 to select the color attribute "white."

At 1910, the network page is updated based at least in part on the variation selected for the item attribute. As a non-limiting example, the currently selected value (e.g., previously "blue" now "white") may be presented at the network page. As a non-limiting example, the selection of the graphical interface element 416 may cause the color "white" to be presented at 426 within the expanded area 408 of FIG. 4.

Figure 20:
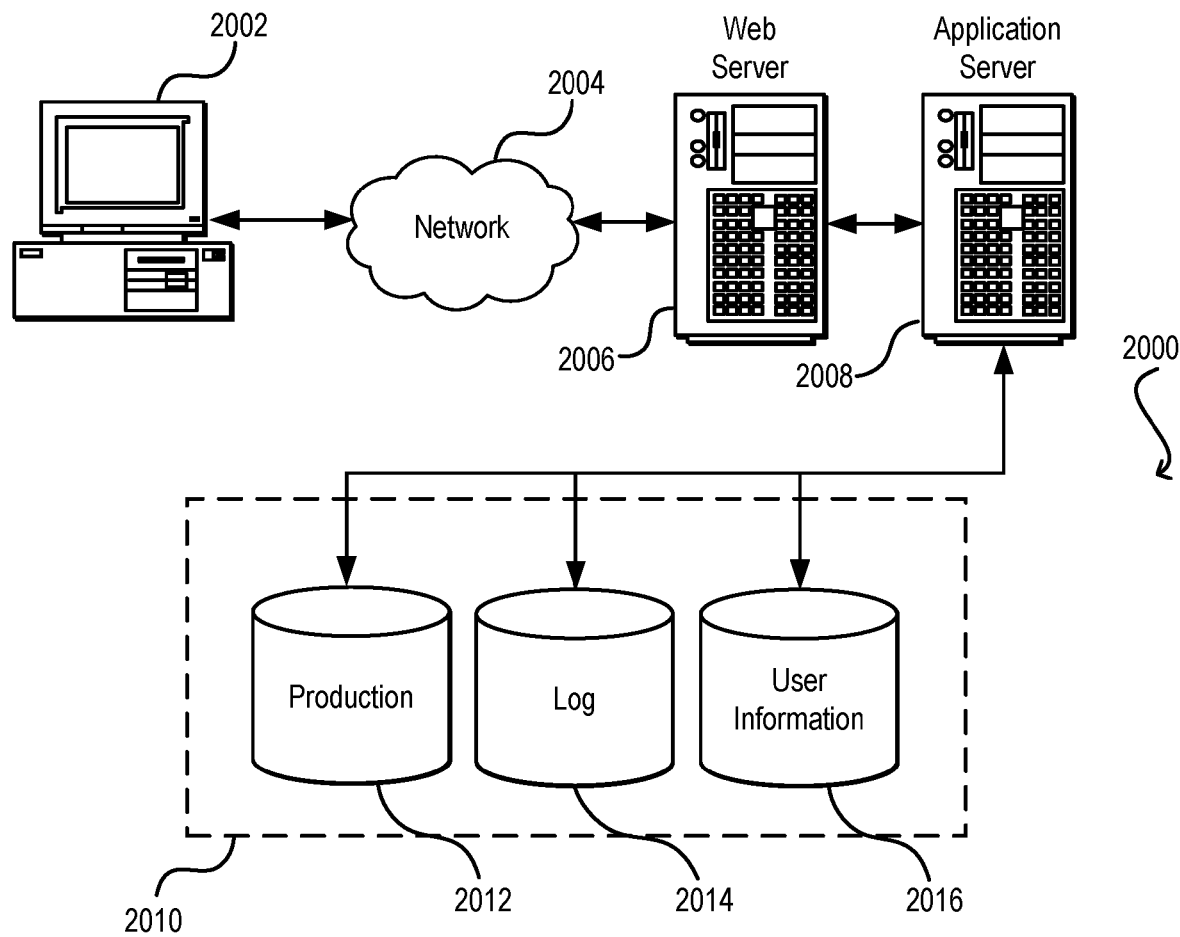
FIG. 20 illustrates an environment in which various embodiments can be implemented.

FIG. 20 illustrates aspects of an example environment 2000 for implementing aspects in accordance with various embodiments. As will be appreciated, although a Web-based environment is used for purposes of explanation, different environments may be used, as appropriate, to implement various embodiments. The environment includes a user device 2002, which can include any appropriate device operable to send and receive requests, messages, or information over an appropriate network 2004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2006 for receiving requests and serving content in response thereto, although for other networks an alternative device serving a similar purpose could be used as would be apparent to one of ordinary skill in the art.

The illustrative environment includes at least one application server 2008 and a data store 2010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 2002 and the application server 2008, can be handled by the Web server. It should be understood that the Web and application servers are not required and are merely example components, as structured code discussed herein can be executed on any appropriate device or host machine as discussed elsewhere herein.

The data store 2010 can include several separate data tables, databases or other data storage mechanisms and media for storing data relating to a particular aspect. For example, the data store illustrated includes mechanisms for storing production data 2012 and user information 2016, which can be used to serve content for the production side. The data store also is shown to include a mechanism for storing log data 2014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 2010. The data store 2010 is operable, through logic associated therewith, to receive instructions from the application server 2008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Webpage that the user is able to view via a browser on the user device 2002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 20. Thus, the depiction of the environment 2000 in FIG. 20 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computing device, a request to display a network page associated with an item of an electronic catalog;
obtaining, by the computing device, an interface specification associated with the network page, the interface specification defining at least one of a format or content to be provided via the network page;
presenting, via the network page, one or more attribute areas, each attribute area corresponding to a respective attribute of the item, the one or more attribute areas individually being presented in an expanded view or a collapsed view in accordance with the interface specification, a first attribute area in the expanded view, the first attribute area presenting a first set of one or more variations of a first item attribute while being presented in the expanded view;
presenting, via the network page, a second attribute area in the collapsed view in which a second set of one or more variations associated with a second item attribute are hidden from view;
receiving first user input within the first attribute area, the first user input indicating a selection of a variation from the first set of one or more variations of the first item attribute;
receiving second user input selecting the second attribute area;
in response to receiving the second user input, collapsing the expanded view of the first attribute area and expanding the collapsed view of the second attribute area, the second attribute area, as expanded, presenting at least one of the second set of one or more variations associated with the second item attribute;
receiving, via the second attribute area as expanded, third user input selecting a specific variation of the second set of one or more variations associated with the second item attribute;
determining that the specific variation selected for the second item attribute is incompatible with the variation selected from the first set of one or more variations;
automatically selecting a different variation of the first item attribute that differs from the variation selected from the first set of one or more variations, the different variation being selected based on being compatible with the specific variation selected for the second item attribute; and
updating the network page based at least in part on the different variation that was automatically selected for the first item attribute.

2. The computer-implemented method of claim 1, wherein the first item attribute is associated with a visual dimension of the item, and wherein an second item attribute is associated with a visual or non-visual dimension of the item.

3. The computer-implemented method of claim 1, wherein the first attribute area is presented adjacent to the second attribute area on the network page in an order specified by the interface specification.

4. The computer-implemented method of claim 3, wherein at least one of the first attribute area or the second attribute area are horizontally scrollable.

5. A computing device, comprising:
one or more processors; and
one or more memories storing executable instructions that, when executed by the one or more processors, cause the computing device to:
receive a request to display a network page associated with an item of an electronic catalog;
obtain an interface specification associated with the network page, the interface specification defining at least one of a format or content to be provided via the network page;
present, via the network page, one or more attribute areas, each attribute area corresponding to a respective attribute of the item, the one or more attribute areas individually being presented in an expanded view or a collapsed view in accordance with the interface specification, a first attribute area in the expanded view, the first attribute area presenting a set of first one or more variations of a first item attribute while being presented in the expanded view;
present, via the network page, a second attribute area in the collapsed view in which a second set of one or more variations associated with a second item attribute are hidden from view;
receive first user input within the first attribute area, the first user input indicating a selection of a variation from the first set of one or more variations of the first item attribute, the first user input being provided within the first attribute area while in the expanded view;
receive second user input selecting the second attribute area;
in response to receiving the second user input, collapse the expanded view of the first attribute area and expand the collapsed view of the second attribute area, wherein the second attribute area, as expanded, presents at least one of the second set of one or more variations associated with the second item attribute;
receive, via the second attribute area as expanded, third user input selecting a specific variation of the second set of one or more variations associated with the second item attribute;
determine that the specific variation selected for the second item attribute is incompatible with the variation selected from the first set of one or more variations;
automatically select a different variation of the first item attribute that differs from the variation selected from the first set of one or more variations, the different variation being selected based on being compatible with the specific variation selected for the second item attribute; and
update the network page based at least in part on the different variation that was automatically selected for the first item attribute.

6. The computing device of claim 5, wherein executing the executable instructions further causes the computing device to present an image of the item at the network page, wherein updating the network page based at least in part on the different variation selected for the first item attribute further comprises presenting a different image of the item at the network page, the different image depicting the item according to the different variation selected for the first item attribute.

7. The computing device of claim 5, wherein at least one of the first set of one or more variations of the first item attribute is initially hidden from view.

8. The computing device of claim 5, wherein executing the executable instructions further causes the computing device to:
   determine that a total number of variations of the first item attribute exceeds a predefined threshold;
   provide an ingress option corresponding to a complete list of the variations of the first item attribute; and
   in response to identifying that the ingress option has been selected, navigate to a second network page comprising the complete list of the variations of the first item attribute.

9. The computing device of claim 5, wherein executing the executable instructions further causes the computing device to reorder the first set of one or more variations of the first item attribute within the first attribute area based at least in part on the variation selected from the first set of one or more variations of the first item attribute.

10. The computing device of claim 5, wherein the first item attribute is associated with a visual dimension of the item and the second item attribute is associated with a non-visual dimension of the item, and wherein the first attribute area is positioned above the second attribute area based at least in part on the first item attribute being associated with the visual dimension of the item and the second item attribute being associated with the non-visual dimension of the item.

11. The computing device of claim 5, wherein executing the executable instructions further causes the computing device to present, at a static position within the network page, current selection data determined based at least in part on at least one of the first user input, the second user input, or default values corresponding to one or more attributes of the item.

12. The computing device of claim 11, wherein the interface specification identifies corresponding default values for the first item attribute and the second item attribute.

13. A non-transitory computer readable storage medium comprising one or memories storing computer-executable instructions that, when executed with one or more processors of a computing device, cause the computing device to:
   receive a request to display a network page associated with an item of an electronic catalog;
   obtain an interface specification associated with the network page, the interface specification defining at least one of a format or content of the network page;
   present, via the network page, one or more attribute areas, each attribute area corresponding to a respective attribute of the item, the one or more attribute areas individually being presented in an expanded view or a collapsed view in accordance with the interface specification, a first attribute area in the expanded view, the first attribute area presenting a first set of one or more variations of a first item attribute while being presented in the expanded view;
   present, via the network page, a second attribute area in the collapsed view in which a second set of one or more variations associated with a second item attribute are hidden from view;
   receive first user input within the first attribute area, the first user input indicating a selection of a variation from the first set of one or more variations of the first item attribute;
   receive second user input selecting the second attribute area;
   in response to receiving the second user input, collapse the expanded view of the first attribute area and expand the collapsed view of the second attribute area, wherein the second attribute area, as expanded, presents at least one of the second set of one or more variations associated with the second item attribute;
   receive, via the second attribute area as expanded, third user input selecting a specific variation of the second set of one or more variations associated with the second item attribute;
   determine that the specific variation selected for the second item attribute is incompatible with the variation selected from the first set of one or more variations;
   automatically select a different variation of the first item attribute that differs from the variation selected from the first set of one or more variations, the different variation being selected based on being compatible with the specific variation selected for the second item attribute; and
   update the network page based at least in part on the different variation that was automatically selected for the first item attribute.

14. The non-transitory computer readable storage medium of claim 13, wherein the first attribute area is horizontally scrollable, wherein additional attributes of the item are presented with each variation of the first item attribute, and wherein a corresponding value for at least one of the additional attributes is determined based at least in part on a default value associated with the second item attribute.

15. The non-transitory computer readable storage medium of claim 14, wherein the first attribute area identifies the default value of the first item attribute and wherein the second attribute area identifies the default value for the second item attribute.

16. The non-transitory computer readable storage medium of claim 14, wherein executing the computer-executable instructions further causes the computing device to
   update the network page based at least in part on the variation selected from the first set of one or more variations of the first item attribute.

17. The non-transitory computer readable storage medium of claim 13, wherein executing the computer-executable instructions further causes the computing device to present at least one notification indicating the different variation was selected for the first item attribute in response to selecting the specific variation for the second item attribute.

* * * * *